US011888398B2

(12) United States Patent
Zhou et al.

(10) Patent No.: US 11,888,398 B2
(45) Date of Patent: Jan. 30, 2024

(54) SELF RECONFIGURABLE, ADAPTABLE POWER ELECTRONICS BUILDING BLOCK (A-PEBB)

(71) Applicant: GE Energy Power Conversion Technology Limited, Warwickshire (GB)

(72) Inventors: Zhi Zhou, Niskayuna, NY (US); Steven Mankevich, Cranberry Township, PA (US)

(73) Assignee: GE Energy Power Conversion Technology Limited, Warwickshire (GB)

( * ) Notice: Subject to any disclaimer, the term of this patent is extended or adjusted under 35 U.S.C. 154(b) by 68 days.

(21) Appl. No.: 17/358,059

(22) Filed: Jun. 25, 2021

(65) Prior Publication Data
US 2022/0416660 A1 Dec. 29, 2022

(51) Int. Cl.
*H02M 3/158* (2006.01)
*H02M 1/00* (2006.01)
(Continued)

(52) U.S. Cl.
CPC ......... *H02M 3/1582* (2013.01); *H02J 7/0024* (2013.01); *H02M 1/007* (2021.05); *H02M 7/25* (2013.01)

(58) Field of Classification Search
CPC ...... H02M 3/1582; H02M 1/007; H02M 7/25; H02J 7/0024
See application file for complete search history.

(56) References Cited

U.S. PATENT DOCUMENTS 7,893,561 B2  2/2011  Weidenheimer
8,400,012 B2  3/2013  Weidenheimer
(Continued)

FOREIGN PATENT DOCUMENTS

CN   107579650 A   1/2018
CN   109219919 A   1/2019
(Continued)

OTHER PUBLICATIONS

Extended European Search Report for EP Application No. 22179134.6 dated Oct. 28, 2022, 8 pages.

*Primary Examiner* — Jared Fureman
*Assistant Examiner* — Duc M Pham
(74) *Attorney, Agent, or Firm* — WOOD IP LLC

(57) ABSTRACT

A power conversion system for mobile power generation and support is configured to be adaptable to different, time-varying mission requirements, system statuses, environmental contexts, and for different power sources and power loads. Adaptability includes real-time, on-the-fly adaptation from DC-to-AC, AC-to-DC, AC-to-AC, and DC-to-DC conversion; adaptations from buck conversion to boost conversation; and from current source conversion mode to voltage source conversion mode. In an embodiment, individual internal power stages for one or more power electronics building blocks are equipped with multiple internal current routing switches/contactors. Current flow may be dynamically re-routed along different current paths associated with an H-bridge of each power stage. Alternative current routings allow for the introduction or removal of inductors at critical points along the current path. Such on-the-fly current rerouting, at the power transistor level, enables the adaptability of the power converter. Specific open/closed switch settings and specific current routing configurations are presented.

21 Claims, 12 Drawing Sheets

(51) Int. Cl.
*H02J 7/00* (2006.01)
*H02M 7/25* (2006.01)

(56) References Cited

U.S. PATENT DOCUMENTS

| | | |
|---|---|---|
| 8,860,396 B2 | 10/2014 | Giuliano |
| 9,362,826 B2 | 6/2016 | Giuliano |
| 9,450,274 B2 | 9/2016 | Vo |
| 9,712,051 B2 | 7/2017 | Giuliano |
| 10,074,997 B2 | 9/2018 | Vo |
| 10,218,277 B2 | 2/2019 | Carralero |
| 10,326,358 B2 | 6/2019 | Giuliano |
| 10,381,924 B2 | 8/2019 | Giuliano |
| 10,404,162 B2 | 9/2019 | Giuliano |
| 10,541,611 B2 | 1/2020 | Giuliano |
| 10,680,515 B2 | 6/2020 | Giuliano |
| 10,917,007 B2 | 2/2021 | Giuliano |
| 10,938,300 B2 | 3/2021 | Giulian |
| 10,978,871 B2 | 4/2021 | Zhou |
| 2014/0198545 A1 | 7/2014 | Lawson et al. |
| 2019/0148939 A1* | 5/2019 | Zhou ............... H02M 7/797 |
| | | 307/43 |
| 2020/0127557 A1 | 4/2020 | Giuliano |
| 2021/0257909 A1* | 8/2021 | Roessig ............... G05F 1/10 |
| 2022/0052611 A1* | 2/2022 | Ngoua Teu Magambo ........... |
| | | H02M 3/33584 |

FOREIGN PATENT DOCUMENTS

| | | |
|---|---|---|
| CN | 109672321 A | 4/2019 |
| EP | 2194638 A2 | 6/2010 |
| EP | 3176937 A1 | 6/2017 |
| EP | 2705597 B1 | 8/2018 |
| EP | 2973935 B1 | 10/2018 |
| EP | 3425784 A1 | 1/2019 |
| EP | 3484042 A1 | 5/2019 |
| EP | 3624188 A1 | 3/2020 |
| GB | 2505371 B | 2/2018 |
| WO | 2014145756 A1 | 9/2014 |
| WO | 2021092658 A1 | 5/2021 |

* cited by examiner

Exemplary Table of Conversion Modes with Matching Contactor Setting

390 Table A

| | 392 | 395.1 | 395.2 | 397 |
|---|---|---|---|---|
| Conversion Mode (CM) | | Closed switches / contactors | Opened switches / contactors | Input / Output |
| VSC (Voltage Source Converter) | | | | |
| (CM1) DC <-> DC (Buck) | | SW1, SW2, SW3, SW6, SW9, SW15 | SW4, SW5, SW7, SW8, SW14, SW16 | (An, Bn) / (Xn, Yn) |
| (CM2) DC <-> DC (Boost) | | SW1, SW2, SW3, SW6, SW9, SW15 | SW4, SW5, SW7, SW8, SW14, SW16 | (Xn, Yn) / (An, Bn) |
| (CM3) DC <-> DC (Buck&Boost) | | SW2, SW5, SW8, SW9, SW15, SW16 | SW1, SW3, SW4, SW6, SW7, SW14 | (An, Bn) / (Xn, Yn) |
| (CM4) DC <-> AC | | SW1, SW2, SW4, SW5, SW6, SW7, SW15 | SW3, SW8, SW9, SW14(*), SW16 | (An, Bn) / (Xn, Yn) |
| (CM5) AC <-> AC (**) | | SW1, SW2, SW4, SW5, SW6, SW7, SW15 | SW3, SW8, SW9, SW14(*), SW16 | (X0, Y0) / (X5, Y5)(**) |
| CSC (Current Source Converter) | | | | |
| (CM6) DC <-> AC / DC | | SW1, SW2, SW4, SW5, SW6, SW7, SW14 | SW3, SW8, SW9, SW15, SW16 | (An, Bn) / (Xn, Yn) |

(*) For CM4 and CM5, the default and preferable setting for SW14 is open. However, SW14 could be in either open or closed position (non-conducting or conducting). In operation, and in some embodiments, SW14 may be left in its previous position (open or closed) even when other switches may be reset to change into modes CM4 or CM5.

(**) For CM5 to be operable in an A-HPEBB LRU 200, *both* adaptable PEBBs (A-PEBBS) 300.1, 300.2 (that is, the two terminal A-PEBBS, see FIG. 2) must *each* be set to mode CM5. The applicable input and output connections then are for the entire A-PEBB LRU -- that is, connections (X0, Y0) and (X5, Y5) (see again FIG. 2).

FIG. 3C

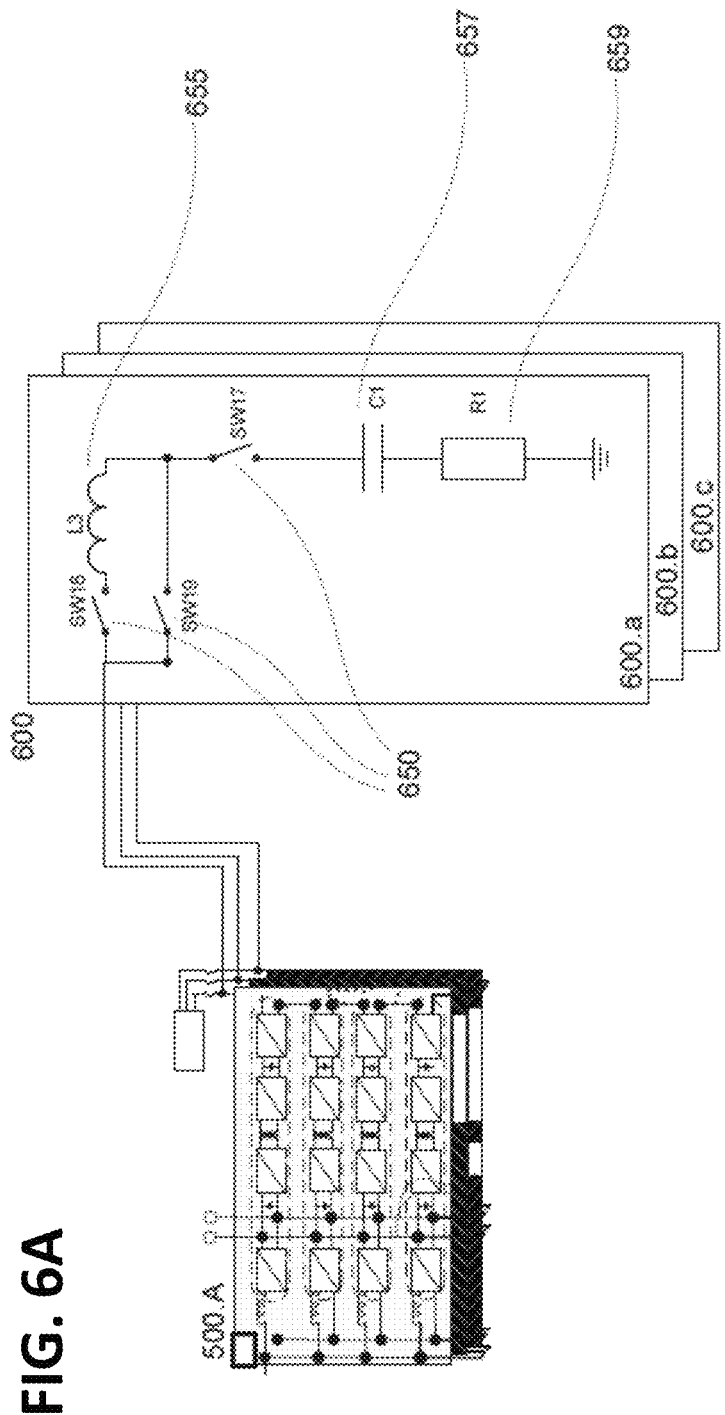

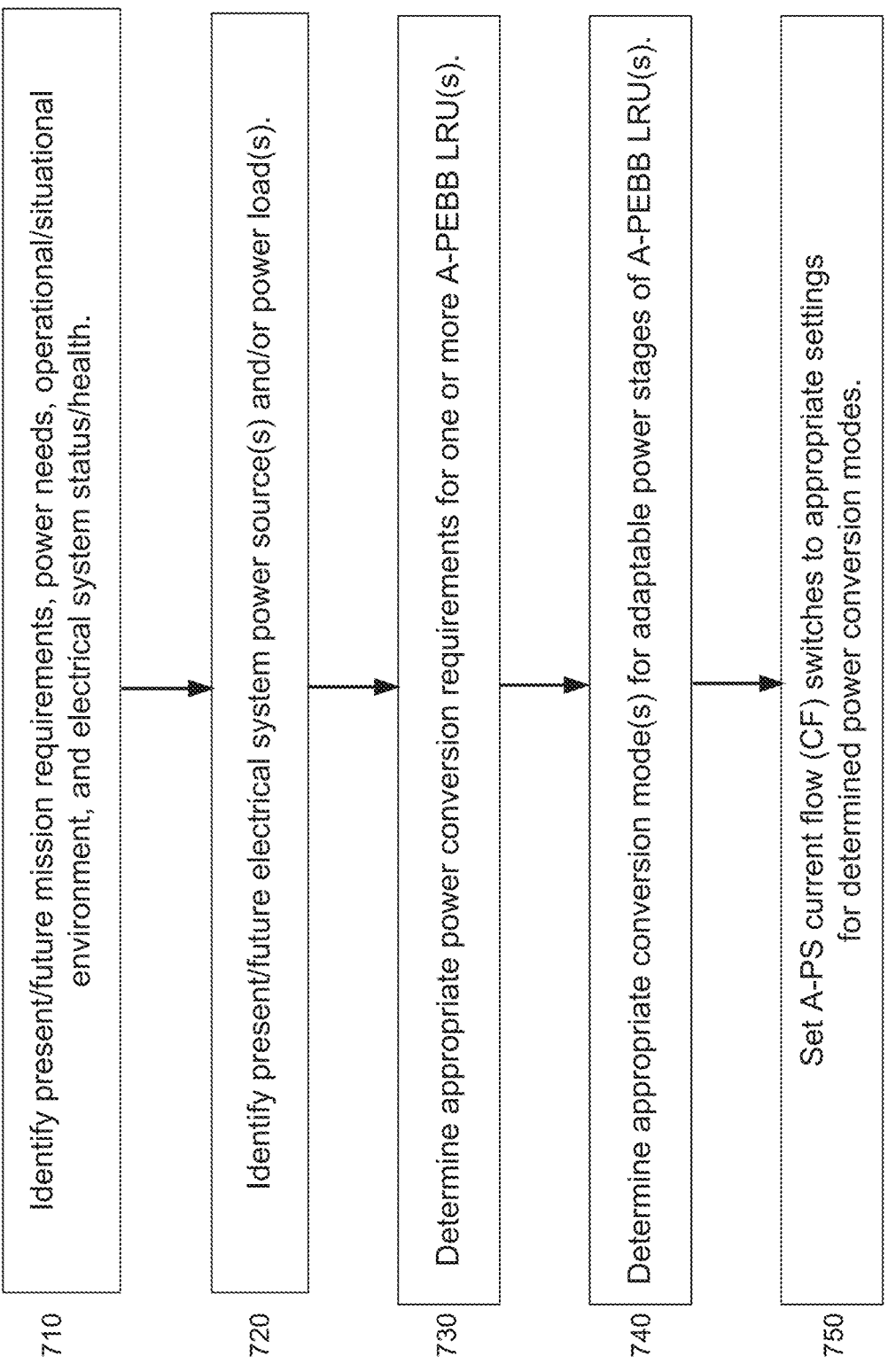

SELF RECONFIGURABLE, ADAPTABLE POWER ELECTRONICS BUILDING BLOCK (A-PEBB)

I. FIELD OF THE INVENTION

The present subject matter relates generally to high-power electronics power systems, and more particularly to high power converters for converting voltages or currents in high-power electrical power systems rated for hundreds or thousands of volts and for megawatt loads. The subject matter further relates to power electronics building blocks (PEBBs) which are fundamental elements of modular and scalable power converters.

II. BACKGROUND

Power Converters and PEBBs: Medium-to-high power electrical grid systems, with the capacity to transfer hundreds or thousands of volts for megawatt loads, may provide electricity for large-scale electrical systems which are employed in industrial plants, factories, office buildings, apartment blocks, or entire cities. Large transport vehicles (such as large ships and airplanes may also have on-board power generators and associated, vehicle-spanning transfer grids which may support megawatt loads.

One element of such grids are power conversion systems, or power converters, which transform electric power in medium and high power electronic distributed power buses and grids, for example. Such power converters may: (i) convert higher voltages to lower voltages; (ii) convert lower voltages to higher voltages; (iii) convert electricity from one alternating current frequency to another; or (iv) convert from direct current to alternating current, or alternating current to direct current. Power converters may perform additional functions as well, such as phase changes and electrical signal filtering/cleanup.

The present system and method for power converters is particularly though not exclusively suited for microgrids such as those found on ships and airplanes. (Grids and microgrids are generally referred to in this document as "power systems.")

Electrical power systems generally consist of generation, transmission, distribution, and end use elements. Power generation in the form of electrical current is supplied by an electric generator or generators (which may in turn be fueled by fossil fuels or nuclear power), or by renewable energy systems such as solar power and windmills. En route to its final load (devices which use the electric power), the electrical power is typically received and transmitted on by one or more power converters. For example, a generator-side converter can receive alternating current (AC) power from the generator via a stator bus, and can convert the AC power to a suitable output frequency, such as the power grid frequency. The AC power is provided to the electrical grid via a line bus.

Low, medium, and high voltages are not rigidly defined, but for example the term "low voltage" may refer to voltages less than or equal to 1.5 kV, "medium voltage" may refer to voltages greater than 1.5 kV and less than 100 kV, and high voltage may refer to voltages at 100 kV and above.

A Power Electronics Building Block (PEBB) is a structural and functional element of a power converter. A PEBB may be any power processor that converts any input electrical power to the desired voltage, current, and frequency output. PEBBs are intended for use as part of a modular and scalable power converter architecture typically employing multiple interconnected PEBBs. Each PEBB may be used in various power applications with all its interfaces and operational settings configurable.

A PEBB typically incorporates power transistors and power diodes, gate drives, and other components into a building block with: (i) a configurable and clearly defined functionality, (ii) standardized hardware, (iii) control interfaces, and (iv) interoperability with other PEBBs.

Power Converters for Ships and Other Environments With Compact Space Requirements: Certain environments, such as military and commercial ships and aircrafts, place a premium on the utilization of space. As a result, ships require power converters which are more compact than those which may be employed in land-based environments. It is also desirable to reduce the weight of power conversion systems for maritime applications. Reductions in power converter volume and power converter weight lead to both improved power density and less drag on a ship.

For maritime application, both government- and industry-initiated PEBB research and development efforts have focused on the PEBB 1000 building block, also referred to as the "PEBB 1000 Least/Line Replaceable Unit" (hereinafter, "PEBB 1000 LRU").

In a known hardware configuration, a PEBB 1000 LRU has three or four power conversion stages with a high frequency solid state transformer positioned in the middle. An existing, modular three or four stage PEBB 1000 LRU will have DC or AC voltages of approximately 1 kVolt (1 kV) (or less) on both sides of the PEBB 1000. The high frequency (Hf) transformer in the middle of the legacy PEBB 1000 LRU has a 1:1 (unity) winding ratio which may have certain benefits in legacy power uses: symmetry, simplicity, and common parts/components (that is, a convention or standard of a 1:1 ratio transformer) for different PEBB 1000 LRUs.

Internally, this existing PEBB 1000 LRU hardware configuration also leverages matured and available 1.2 kV or 1.7 kV rated SiC MOSFET and/or 1.2 kV or 1.7 kV IGBT devices for switching. Known legacy PEBB 1000 LRUs are commonly rated at 85 kW to 125 kW in power, and provide voltages ranging from 680V-to-1 kV DC or from 480V AC to 707V AC. For one megawatt (1 MW) or less power applications, and for a 12 kV or below power applications, a common or unified hardware power converter is typically architected using twelve (12) PEBB 1000 LRUs with paralleled or cascaded connections on each side of the PEBB 1000 LRU (depending on application's voltage requirements). Typically, legacy maritime power converters (involving pulse loads, energy storage, and energy magazines) employ twelve PEBB 1000 LRUs in the converter, and are rated for conversion of 1 kV DC to 450V AC; 1 kV DC to 4160V AC; 1 kV DC to 6 kV DC; or 1 kV DC to 12 kV DC PEBB.

Fixed-Ship-Mission Power-Converter Design Limitations

In legacy art, power converters for ships and other limited space applications are typically designed within the framework of a specific, fixed power architecture designated for use on a manned ship with an established, relatively well-defined mission or range of missions, with a suitable-but-fixed set of power sources and power requirements. For example, a first ship 'A' may be a military vessel (such as a destroyer or cruiser), a second ship 'B' may be a research vessel, and a third ship 'C' may be a cargo or transport vessel.

For power sources, the particular ship 'A' may have a gas turbine main power generator, fuel cells for energy storage, an interface for shore power (when the ship is in dock), and an auxiliary diesel power generator. For loads, ship 'A' may have a port propulsion motor, a starboard propulsion motor, a radar load, a sonar load, one or more pulsed loads (such as weapon systems), and a variety of ship service centers. It may be expected that all the loads for ship 'A' will be in use all or substantially most of the time, or that some loads may be in use only part of the time but with high power demands.

With these factors in mind, the ship-wide power converter system for ship A, and specific power converter sub-systems, may be designed with a particular power architecture (or power topology) 'Pa-A' of AC/DC converters, DC/AC converters, and DC/DC and/or AC/AC converters (along with inverters and other elements). The multiple various converters may be arranged and coupled ship-wide in a specific configuration, such as a radial power distribution system or a zonal power distribution system.

Research vessel 'B', may have a similar size and have a similar power overall/maximum consumption as ship 'A'. However, 'B' has a different mission (or range of missions) as compared with 'A', and so is designed with different and more/fewer power sources, and with different and more/fewer loads. The overall power converter architecture 'Pa-B' for ship B may therefore vary dramatically from 'Pa-A' of ship A. Similar considerations may apply for ship C.

Each ship, A, B, and C, is constrained with a specific power architecture designed for its mission requirements. This may limit the adaptability of any of ships A, B, or C for different missions. Such limitations may further apply within a class of ships. For example, two military ships A1 and A2, one a destroyer and one a cruiser, are typically defined in mission scope and in adaptability, in part at least due to their fixed, specific power architectures.

No Manning Required Ships (NOMARS): Naval ships and other vessels are diverse in design and include "no manning required ships (NOMARS)". Such ships may be unmanned ships with adaptable, flexible mission requirements, and (potentially) with adaptable configurations of power sources and loads. (For example, power sources and loads may be changed when such a ship is in dock.) Such NOMARS ships, in addition to various advantages that accrue from being unmanned during operations, may also be more adaptable for a range of peace-time military, battle-military, and even strictly commercial or civilian missions.

Power Systems for NOMARS: To assure maximum mission adaptability, NOMARS will require an integrated and flexible power generation and distribution system, which is adaptable to various power/energy sources (prime movers/gensets, solar PV, energy storage etc.) and to a variety of loads (AC, DC, pulsating, continuous, and UPS etc.). Critical characteristics/features of such NOMARS power systems, adaptable for diverse missions, include modularity and adaptability based on (operation and health) conditions of the ship and the situation/environment the ship is in.

What is needed, then, is an advanced power electronics architecture suitable for supporting mission adaptation and change, without requiring any hardware swapping, while a ship is in service. What is further needed are power electronics building blocks (PEBBs) which are suitable for power generation and power distribution in NOMARs ships and in other unmanned vehicles (UxV) such as unmanned underwater vehicles, unmanned aerial vehicles, and also unmanned surface vehicles, aircraft, and spaceships.

III. BRIEF SUMMARY OF THE INVENTION

In some embodiments, the present system provides for an adaptable power converter system with multiple connected, separate power building blocks (which may for example be coupled with each other via a backplane or via electrical cabling). At least some, and possibly all of the building blocks are adaptable power electronics building block least replaceable units (A-PEBB LRUs). In one exemplary embodiment, an A-PEBB LRU may be built with SiC MOSFETs, and employs a connection topology which is self-reconfigurable.

In an exemplary embodiment, an A-PEBB LRU is a discrete unit which may include four power stages, which may be full bridge converters (also referred to as H-bridges) which are electrically coupled in series. The series of four power stages starts and terminates with two outer H-bridges (which connect to power sources or power loads, referred to generally as "power resources"). Sandwiched between the two outer bridges are two inner bridges/power stages which are coupled via a high frequency (100-200 kHz) solid state isolation transformer. The two outer bridges or power stages are self-configurable power stages or adaptable power stages. Each self-configurable power stage (SCPS) may also be referred to at points as a self-configurable H-Bridge (SCHB).

In an exemplary embodiment, an SCPS may consist of four SiC MOSFET switches/devices, each with an antiparallel diodes, along with a plurality of electrical contactors (mechanical switches, relays) and/or electronic switches (low power transistors) which can be used to change the path flow of electric current in the SCPS, thereby adapting the operations of the SCPS in real-time. In addition, a number of inductors in the SCPS may be employed to further regulate the internal current flow. In one exemplary embodiments, two separate inductors (that is, inductors not part of a transformer unit) may be employed. Below, this document presents one exemplary connection topology for these elements.

Via the lower-power transistors, the adaptable SCPS can be self-configured to variously serve, at any one given time, as any one of a bidirectional DC to DC converter, a bidirectional DC to AC, and a bidirectional AC to AC converter; that is to say, the SCPS has multiple adaptable power conversion modes, all with embedded compact high frequency isolation transformer.

Among other modes, the SCPS can be self-configured as any one of a bidirectional buck, boost, or buck & boost DC to DC converter. By suitably changing the operational modes of the outer H-bridges, the operational modes of an entire A-PEBB can be changed or reconfigured for different power applications and different mission modes.

IV. BRIEF DESCRIPTION OF THE DRAWINGS

Advantageous designs of embodiment of the present invention result from independent and dependent claims, the description, and the drawings. In the following, preferred examples of embodiments of the invention are explained in detail with the aid of the attached drawings. The drawings, which are incorporated herein and form part of the specification, illustrate the present invention and, together with the description, further serve to explain the principles of the invention and to enable a person skilled in the relevant art(s) to make and use the invention.

FIG. 1 presents a schematic view of an exemplary large-scale electrical system, which may for example be a ship-board electrical system.

Figure 3A:
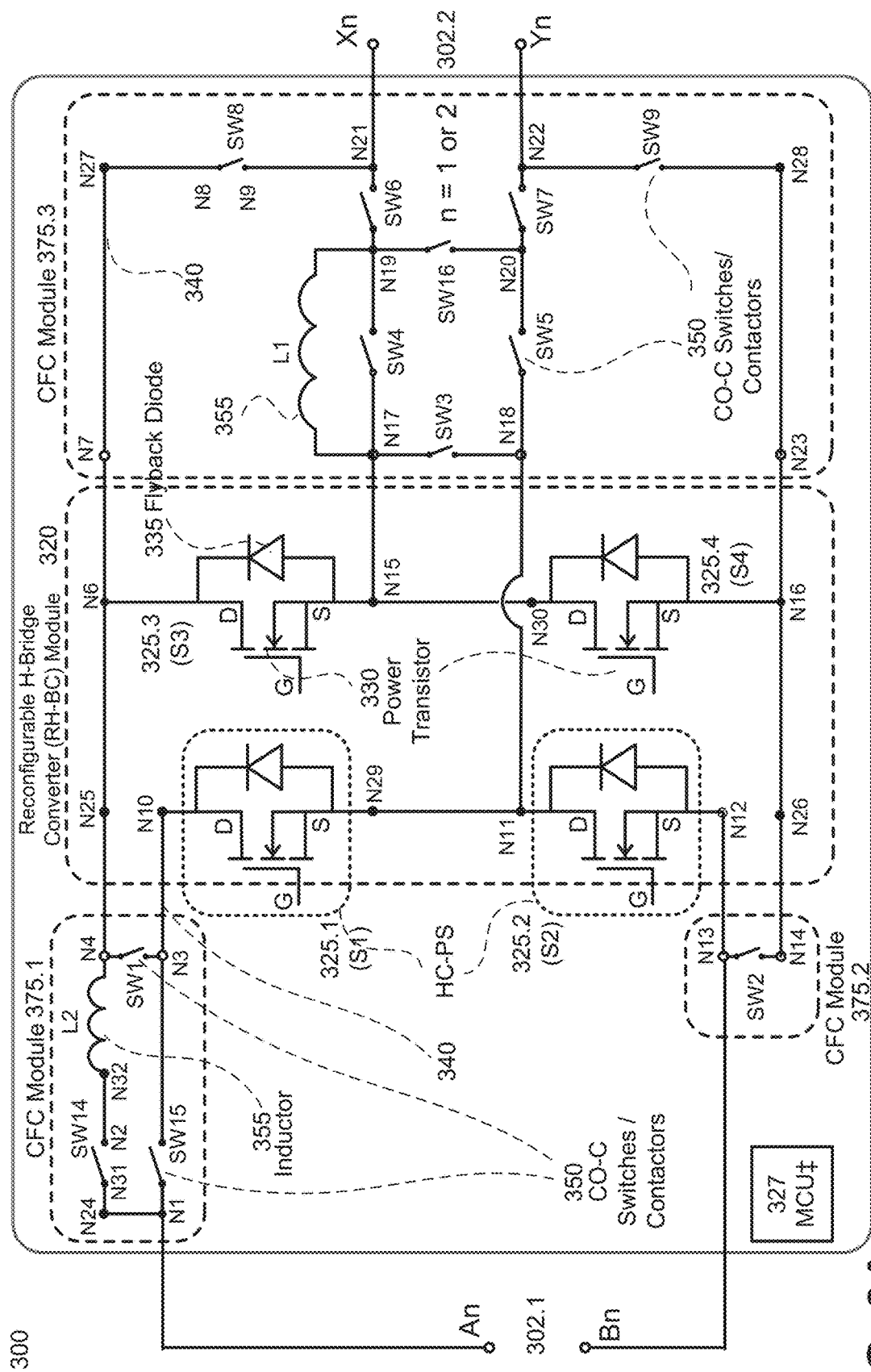
FIG. 3A is a schematic illustration of an exemplary adaptable power stage (A-PS) according to the present system and method.
Figure 3B:
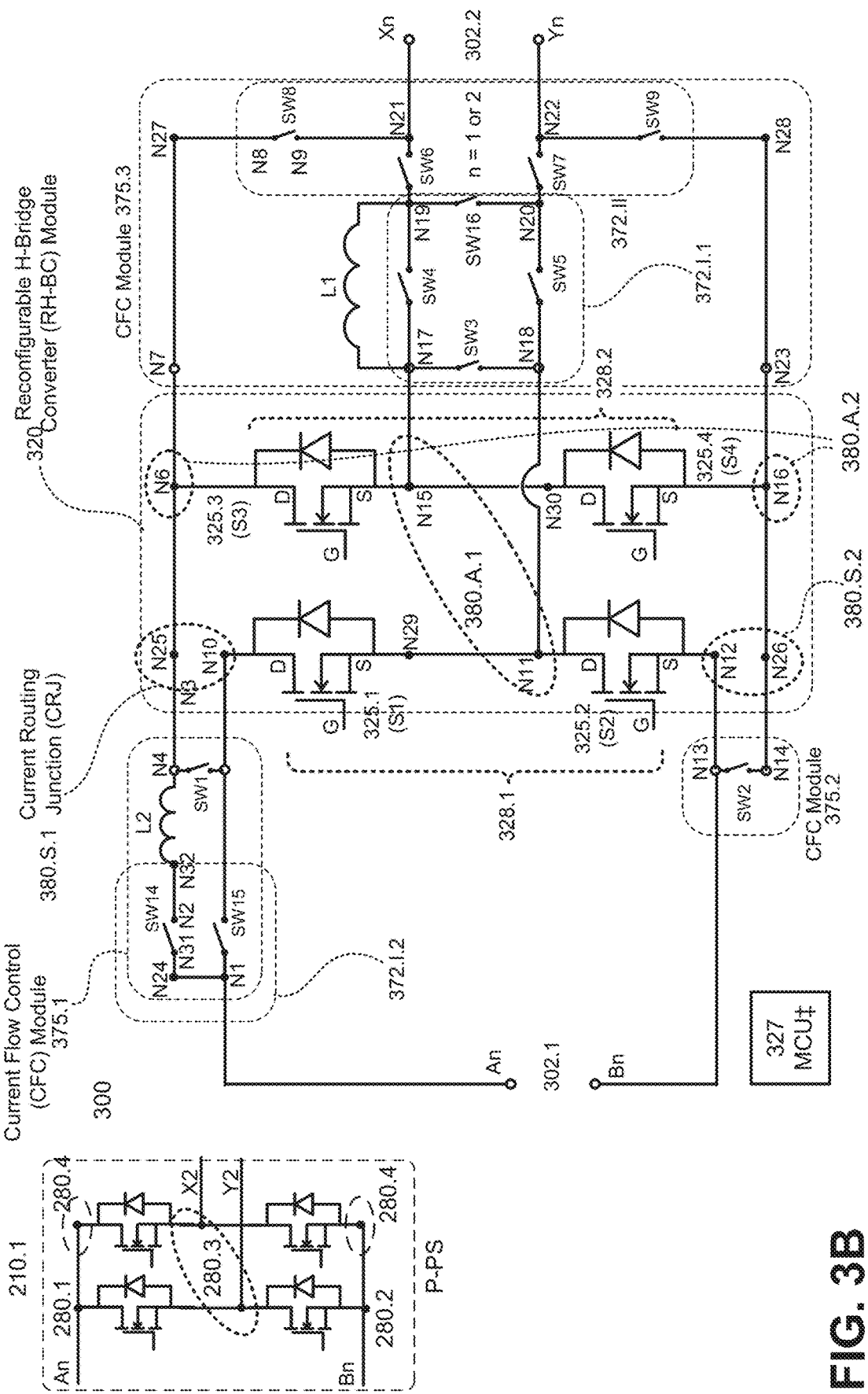

FIG. 3B presents another exemplary view of the adaptable power stage (A-PS) of FIG. 3A.

FIG. 3C presents an exemplary table of power conversion modes with matching electrical contactor settings for the exemplary A-PS of FIG. 3A.

Figure 4A:
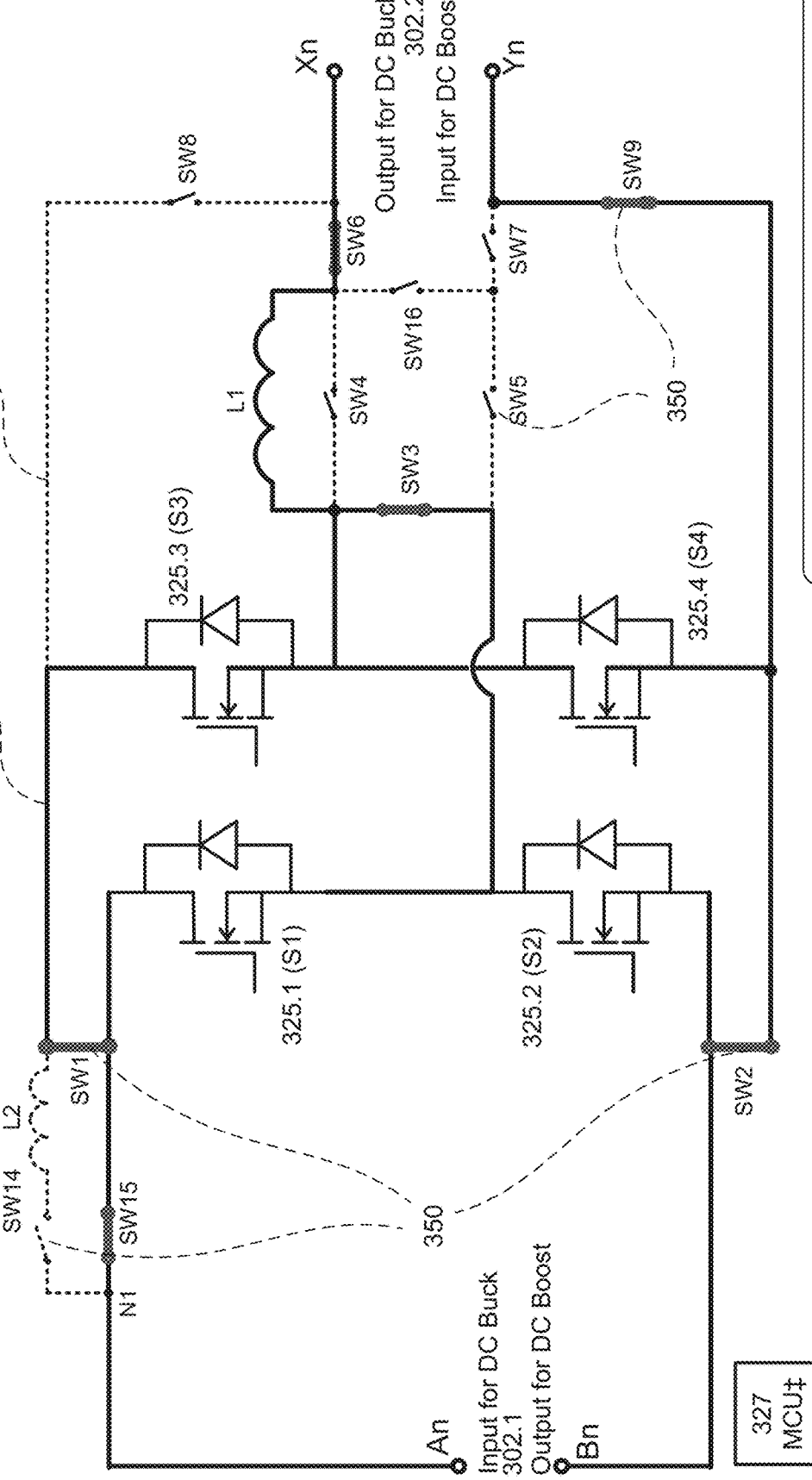

FIG. 4A is a schematic illustration of the exemplary A-PS of FIG. 3A with the electrical contactors set for either of two particular, selected power modes.

Figure 4B:
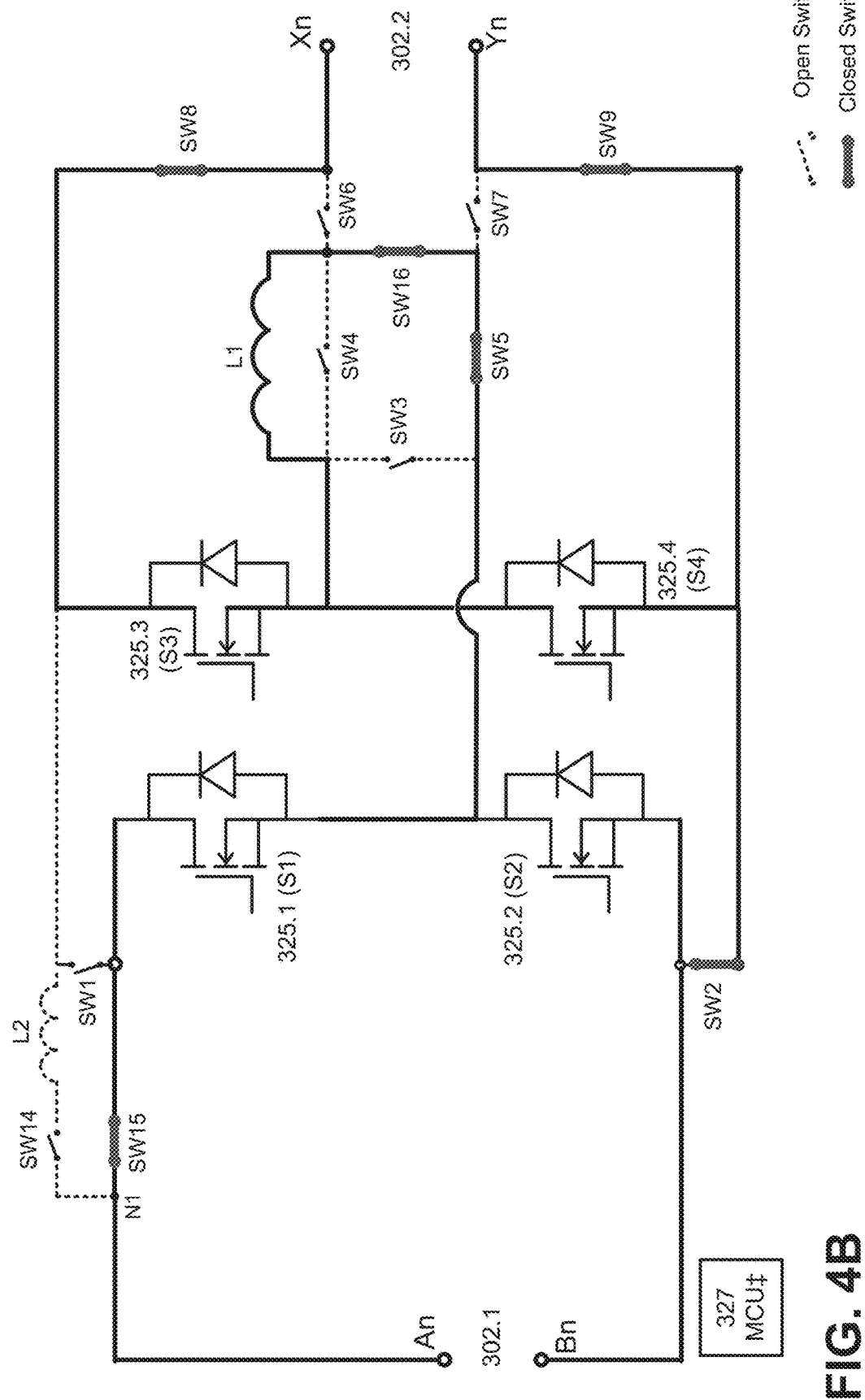

FIG. 4B is a schematic illustration of the exemplary A-PS of FIG. 3A with the electrical contactors set for a particular, selected power mode.

Figure 4C:
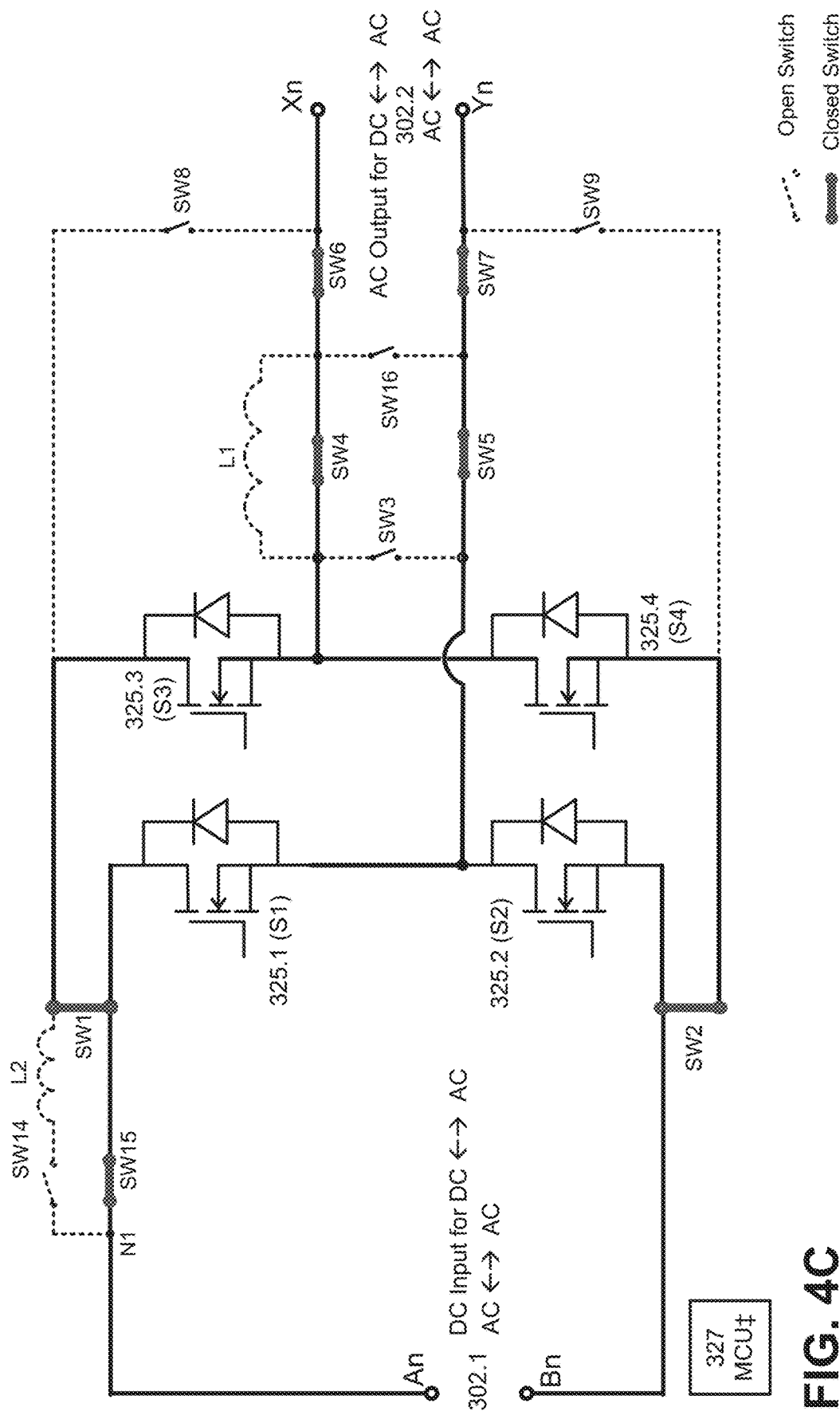

FIG. 4C is a schematic illustration of the exemplary A-PS of FIG. 3A with the electrical contactors set for either of two particular, selected power modes.

Figure 4D:
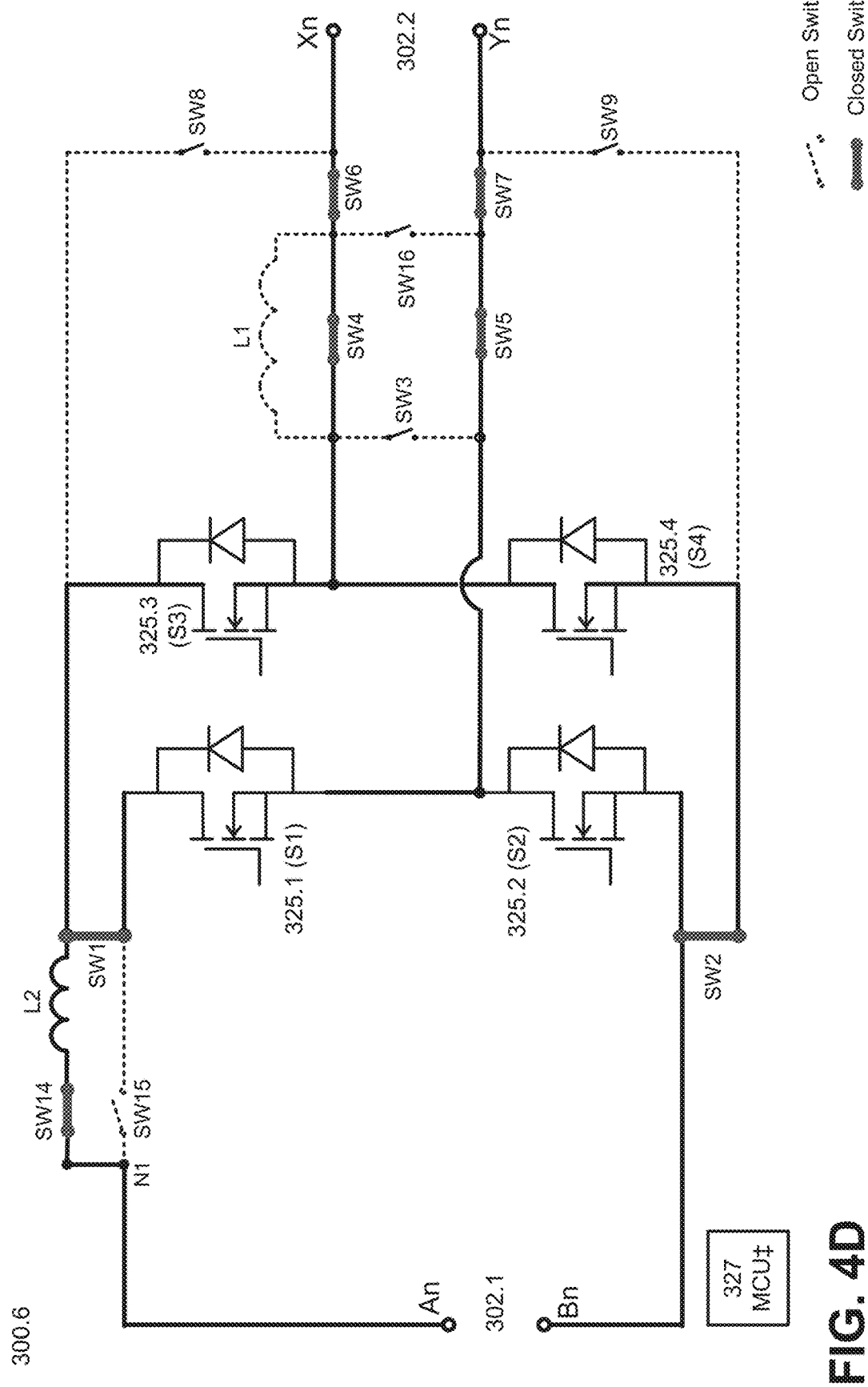

FIG. 4D is a schematic illustration of the exemplary A-PS of FIG. 3A with the electrical contactors set for either of two particular, selected power modes.

Figure 5:
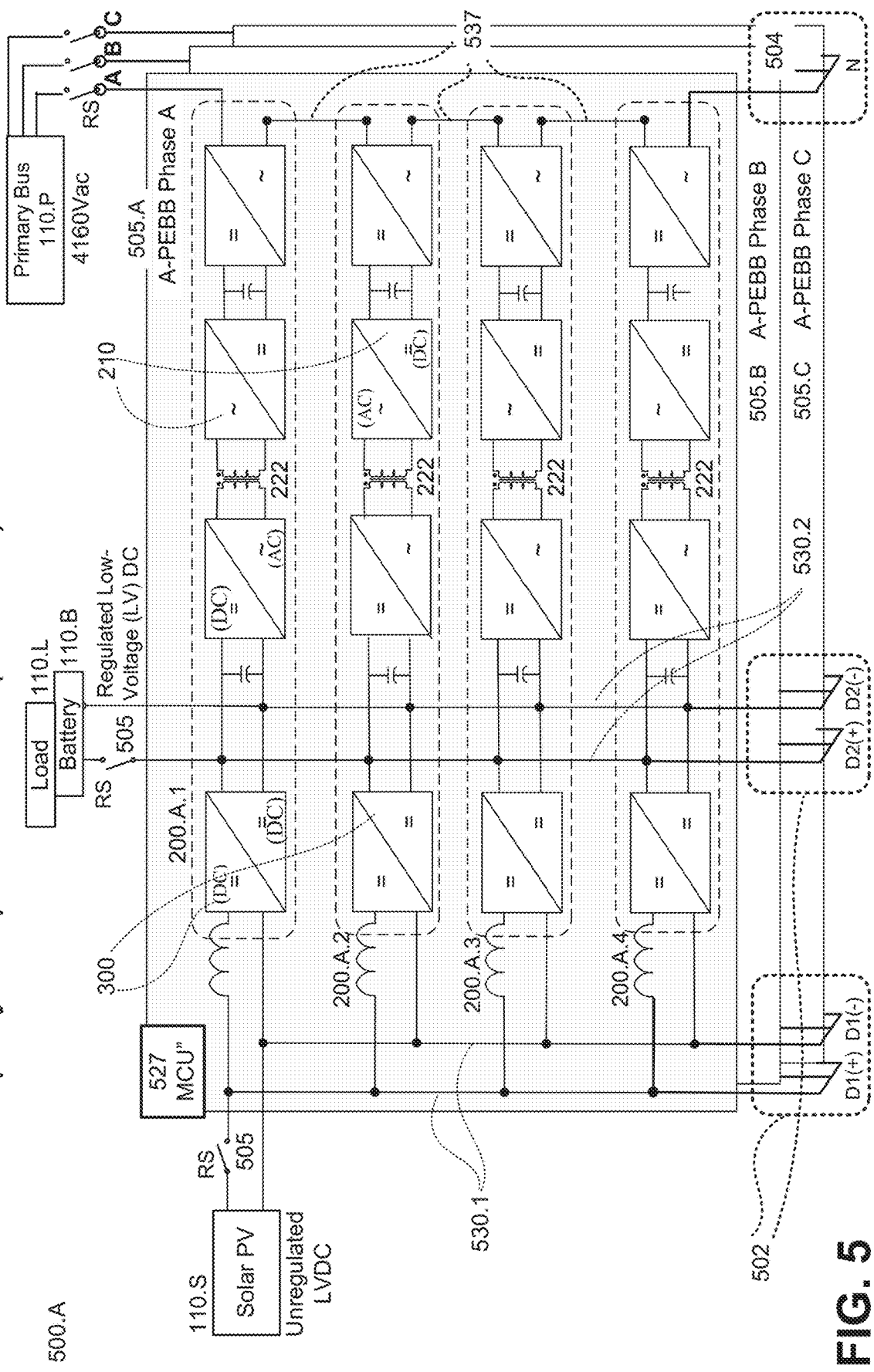

FIG. 5 is a schematic illustration of an exemplary full DC↔AC converter with multiple A-PEBB LRUs made of multiple A-PSs.

FIG. 6A is a schematic illustration of a self-configurable and adaptable output filter for the A-PEBB based converter of FIG. 5.

FIG. 6B presents an exemplary table of the electrical switches/contractors status or position (open or closed) for the self-configurable and adaptable output filer of FIG. 6A.

FIG. 7 is a flow chart of an exemplary A-PEBB based power converter self-configuration process.

Regarding text in the Figures: Any text in the figures is provided for convenience as an aid to understanding, to remind the reader of at least one possible embodiment of an element. Such text should not be construed a limiting, and different elements may be known or understood by additional or alternative labels, nomenclature, or alternative embodiments, as described within the written disclosure. Specific functional or operational values shown in the figures (for example, voltage values or power values) should be construed as exemplary only and not limiting.

V. DETAILED DESCRIPTION OF EMBODIMENTS OF THE INVENTION

While the present invention is described herein with illustrative embodiments for particular applications, it should be understood that the invention is not limited thereto.

The following detailed description is merely exemplary in nature and is not intended to limit the system, configurations, and methods taught, nor to limit the elements or steps of the system, configurations, and methods taught, nor to limit the applications of the present systems, methods, and configurations as disclosed herein. Further, there is no intention for the scope to be bound or limited to or by any theory presented in the preceding background or summary, nor in the following detailed description. Those skilled in the art with access to the teachings provided herein will recognize additional modifications, applications, and embodiments within the scope thereof and additional fields in which the invention would be of significant utility.

Throughout the application, description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of power systems. However, it will be understood by one of skilled in the art, that in some specific instances, an embodiment can alternatively be described using the language "consisting essentially of" or "consisting of."

For purposes of better understanding the present teachings and in no way limiting the scope of the teachings, it will be clear to one of skilled in the art that the use of the singular includes the plural unless specifically stated otherwise. Therefore, the terms "a," "an" and "at least one" are used interchangeably in this application.

Headings used in this detailed description are present only to assist in making this document readable and easy to navigate, and should not be construed as defining or limiting.

The system and method is not limited to the embodiments described below, which are exemplary only. Rather, the full scope of the system and method is recited in the claims which follow. It will be further understood that the appended claims are themselves disclosure, and the full scope of the system and method may include elements which are recited in the claims only.

Large-Scale Electrical Systems

Figure 1:
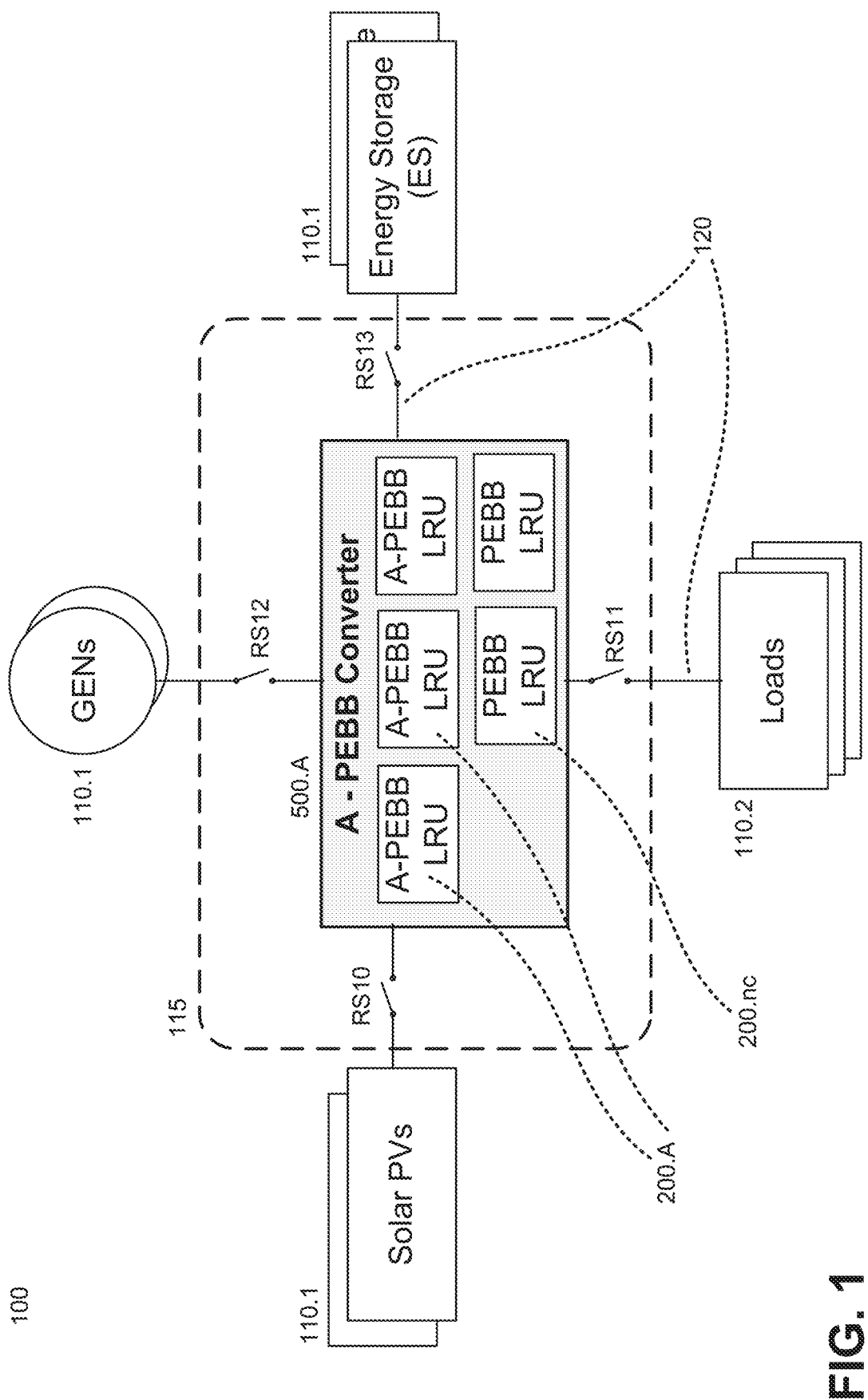

Large-scale electrical systems 100 may be understood as combined power generation, power distribution, and power usage systems which together are employed in large-scale applications. FIG. 1 illustrates an exemplary large-scale electrical system 100, which may for example be a shipboard electrical system. Such large-scale electrical systems 100 may include, for example and without limitation: large ships (military vessels, cargo vessels, passenger liners or large yachts), factories, multi-dwelling unit buildings (apartment complexes and condominiums), office buildings, school buildings, research labs, and other environments which typically entail kilowatt-or-greater power demands. For some such large-scale power systems 100, the primary power source(s) 110.1 may be located off-site (such as a common power generation plant shared by an entire city); for other such large-scale power systems, the primary power generation sources 110.1 may be local (for example, a ship with its own generators, or a campus powered by solar power panels).

Electrical system 100 may include, for example and without limitation: (I) power resources 110 and (II) power converters 500. These are discussed further immediately below.

(I) Power resources 110 refer generally to any electrical sub-system which is either:

(i) a source 110.1 of electric power (including for example and without limitation: a battery, an ultracapacitor, other forms of energy storage modules, a multi-function energy storage module (MFESM), an electric generator, solar power panels, an electric power grid); or (ii) a load 110.2 for electric power (including for example and without limitation lasers, sensors, electric lights, electric motors, heating and cooling systems, radar, sonar, medical equipment, compressors, pumps, digital systems, communication systems, and other systems requiring electric power for operations).

Power sources 110.1 may include gensets, which are a combination of (i) electric generators and (ii) "prime movers", which are the fuel-consuming devices that drive the generators (for example, steam turbine engines, combustion turbine engines, reciprocating engines, wind turbines, and nuclear generators). Power sources 110.1 may also include storage batteries, solar power panels, and capacitance-based batteries or ultracapacitors/supercapacitors.

(II) Power electronics building blocks converters (PEBB converters) 500 are employed as part of an overall power distribution system 115. The PEBB converters 500 serve to step up and/or step down voltages, to convert AC currents to DC currents and vice-versa, and to distribute power among different loads 110.2. The power distribution system 115 may include various routing switches RS for routing or controlling system-wide power flow, where the switches RS, in turn and in various embodiments, may sometimes be integrated into the PEBB converters 500. The power distribution system will also include electrical cabling and wires 120, and other elements such as circuit breakers, local power outlets and local power switches (that is, room-level on/off switches), and other elements known in the art and not illustrated in FIG. 1.

The present system and method pertains to power converters 500 and structural building blocks (PEBBs) 200 of the power converters such as PEBB LRUs 200; the systems described herein are generally configured to operate with one or more power sources 110.1 at a source end and one or more loads 110.2. By convention, the sources are attached to what is referred to as a "first end" or "power end" of PEBBs 500, and the loads are connected to what is conventionally referred to as "second end" or a "load end" of the PEBBs 500. It is noted, however, that:

(i) Larger system topologies may entail multiple power connection points and/or load connection points, so that the "ends" should not be construed as necessarily referring to two structurally opposing ends of the physical system, and (ii) in some exemplary embodiments, it is an element of the present system and method that the A-PEBB LRU's 200.A and PEBBs 500 may be adapted or reconfigured so that source connections become load connections, or vice-versa.

Adaptable PEBB (A-PEBB): In FIG. 1, the exemplary PEBB converter 500 is an adaptable PEBB 500.A (A-PEBB), which is discussed in further detail throughout this document. Though only one A-PEBB converter 500 is illustrated in FIG. 1, persons skilled in the relevant arts will appreciate that a single large-scale electrical system 100 may employ multiple PEBB converters 500 (some of which may be conventional PEBB converters, along with the A-PEBB converters 500.A which are the focus of the present system and method).

It will also be noted that the A-PEBB converter 500 of FIG. 1 is illustrated as having three A-PEBB LRUs 200.A (with interconnections not shown in FIG. 1, see FIG. 5), along with two conventional PEBB LRUs, also referred to as "non-configurable PEBB LRUs" 200.nc. This is exemplary only, and in various embodiments an A-PEBB converter may have one, two, or more internal A-PEBB LRUs 200.A; and may also have zero, one, or more non-configurable PEBB LRUs 200.nc. (In some exemplary embodiments the present system and method, even a single A-PEBB LRU 200.A may serve as a single, stand-alone A-PEBB power converter 500.A. In more typical applications, an A-PEBB converter 500.A will have two or more PEBB LRUs 200.)

For purposes of exposition and teaching below, as well as in the appended claims, and except as may be noted otherwise: the systems disclosed herein as power converters 500 and A-PEBB LRUs 200 are to be construed as functional hardware units which are separate from, and are distinguished from, the power resources 110 (sources or loads) which provide electric power or serve as electric loads for the power converters 500.A. It will be understood, however, that in some contexts and system topologies, a first power converter 500.A may be a power source for a second power converter 500.A, with the second power converter 500.A also being seen as a load on the first power converters 500.A.

Power Converters 500 and Electrical Systems 100: While FIG. 1 illustrates a single A-PEBB converter 500.A, persons skilled in the relevant arts will appreciate that a large-scale electrical system may employ multiple, interconnected A-PEBB converters 500.A (possibly along with one or more conventional PEBB converters), with some A-PEBB converters 500 being end-point power sources for various loads and other A-PEBB converters providing mid-power-stream voltage or current conversions. The details of such electrical system topologies are beyond the scope of this document.

"Buck" and "Boost"

In this document, the term "buck converter" refers to an electrical converter which accepts a higher input voltage B and reduces it, or steps it down, to a lower voltage A. "Bucking" as used herein refers to the act or process of stepping down the voltage from B to A.

In this document, the term "boost converter" refers to an electrical converter which accepts a lower input voltage A and increases it, or steps it up, to a higher voltage B. "Boosting" as used herein refers to the act or process of stepping up the voltage from A to B.

Exemplary Adaptable Electrical Power Systems

In exemplary embodiments, the present system and method is directed in part towards integrated and adaptable/flexible power-generation/power-distribution systems 100, which are adaptable to various power/energy sources 110.1 (prime movers/gensets, solar power, energy storage (batteries, etc.) and a variety of loads 110.2 (AC, DC, pulsating, continuous, and UPS etc.) within the overall system 100.

Such adaptable power systems 100 may be used, for one example, to support shipboard power applications for "no manning required ships (NOMARS)". NOMARS power systems 100 for ships with diverse missions will require modularity and adaptability based on operational and health conditions of the ship, based on varying mission requirements, and also based on the situational environment the ship is in. Advanced power electronics as a key enabling technology will play a vital role in such flexible NOMARS power generation and distribution system.

It is noted that while, in exemplary embodiments, the present system and method may be described herein in the context of NOMARS systems, the present system is equally applicable for use with other unmanned transport vehicles (UxV), including for example and without limitation: unmanned aerial vehicles (UAV), unmanned surface vehicles (USV), and other autonomous ships, aircrafts, and vehicles.

The present system and method may also be employed in large-scale electrical power systems 100 which are part of non-mobile (stationary) facilities which require operations that are both autonomous and mission/context adaptable. The present system and method may also be employed in large-scale electrical power systems 100 which mobile, transportable power generation systems that are used to support various facilities at fixed sites at different times.

In turn, adaptable, large-scale electrical power systems 100 may employ adaptable power electronics converters 500.A, as shown with the exemplary system 100 of FIG. 1. In turn, and as will be apparent both from FIG. 1 and from FIG. 5, adaptable power electronics converters may be built from one or more adaptable line replacement units A-PEBB LRUs 200 which are field adaptable.

The operations of some non-configurable PEBB LRUs 200.*nc* are known in the art, and a description of their components, architecture, topologies, and operations will not be presented in detail in this document. It is noted that the General Electric Company has developed such Power Systems PEBB LRUs 200.*nc* in the past and expects to continue such development in the future; see for example [enter here patent numbers of recently filed applications].

Figure 2:
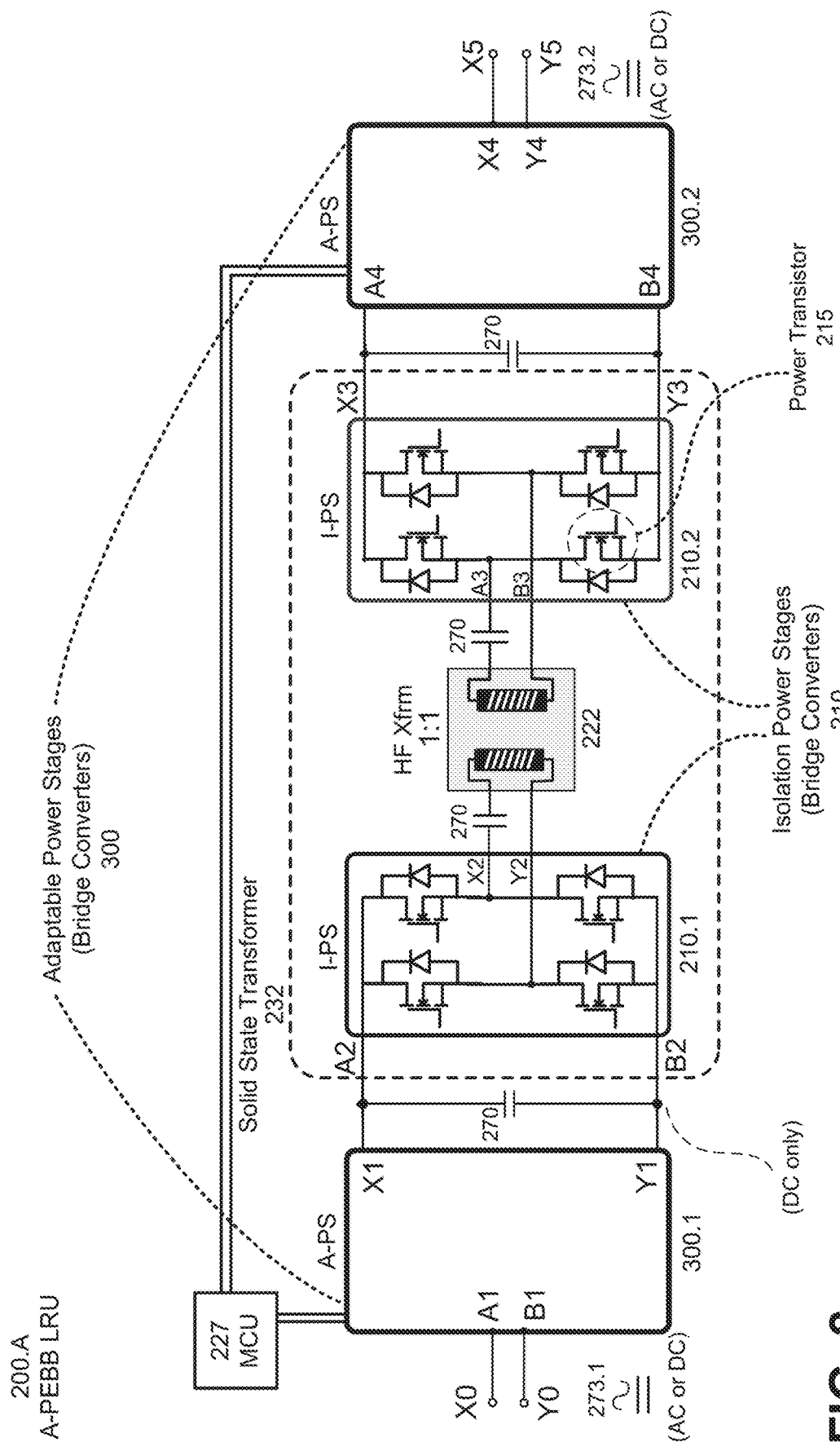
FIG. 2 illustrates an exemplary adaptable power electronics building block (A-PEBB) line replacement unit (LRU), or A-PEBB LRU, according to the present system and method.

FIG. 2 illustrates an exemplary A-PEBB line replacement unit (A-PEBB LRU) 200.A according to the present system and method. Exemplary A-PEBB LRU 200.A includes four power stages 210, 300 which are electrically coupled in series.

Terminal, Adaptable Power Stages: As may be seen from FIG. 2, in one exemplary embodiment the four power stages include two terminal-power stages 300.1 and 300.2, which are adaptable power stages; the internal operations of these two end-power stages are described further below (see especially FIGS. 3 and 4). In some exemplary embodiments of the present system and method, source power 273.1 from one or more power sources 110.1 may be received at one of the two terminal power stages 300 (at terminals X0, Y0), while output power 273.2 for loads 110.2 may come from the other of the two terminal stages 300, at terminals X5, Y5).

It is noted that, while in the figure, input power is provided for at power stage 300.1 and output power is output from power stage 300.2, this is for purposes of illustration only and is not limiting. In some embodiments, it is an advantage of the present system and method that adaptable power stages 300 can be reconfigured, in the field, to reverse the direction of voltage change and/or current flow (for direct current) through the A-PEBB LRU 200.A, so that for example DC electrical current can be input at terminals X5, Y5 with output current then yielded at terminals X0, Y0.

In general, each of the terminal A-PEBB power stages 300 are field adaptable for any or all of: changing the direction of current flow; changing the direction of voltage drop; changing the conversion modes of operation for the A-PEBB LRU 200.A as a whole, for example from buck to boost, from AC/AC to AC/DC, DC/AC, or DC/DC; and for changing overall operations from current source converter 500 to voltage source converter, or vice-versa. Effective control of operational modes for the A-PEBB LRU 200.A as a whole may require coordinating mode switching between the two terminal A-PEBB LRUs 300.

Solid State Transformer: Further with reference to FIG. 2—In exemplary embodiments of the A-PEBB LRU 200.A, sandwiched between the two terminal A-PEBB LRUs 300, and electrically coupled between them in series, is an interior section 232. In an embodiment, the interior section 232 includes a first isolation power stage 210.1 which is coupled in series with a high frequency transformer 222, which is itself further coupled in series with a second isolation power stage 210.2. In an exemplary embodiment, the various power stages 210, 300, along with the transformer 222, may be coupled via exemplary capacitors 270.

The first and second isolation power stages 210 function as full bridge converters. The transformer 222 provides for power transfer between the two interior power stages 210 in the form of voltage inductance, while also providing for galvanic isolation between the terminal stages 300 of the exemplary A-PEBB LRU 200.A as a whole. The entire interior section 232—that is, the transformer 222 proper, along with the two interior power stages 210—may be together viewed as the elements of a compact high frequency (100-200 kHz) solid state isolation transformer 232.

In some embodiments of the present system and method, both of the isolation power stages 210 are provisioned for handling direct currents (DC) so that junctures A2/B2 and X3/Y3 are direct current only. One of the two isolation power stages 210.1, 210.2 provides for high frequency power conversion. However, because the terminal power stages 300 are adaptable, both end terminals X0/Y0 and X5/Y5 of the A-PEBB LRU 200.A can be configured for either of AC or DC.

For the exemplary A-PEBB LRU 200.A of FIG. 2, the exact transistor configuration, diode configuration, and topology of the two isolation power stages 210 is exemplary only, and some variations may be employed as is known in the art. These may include, for example and without limitation, the addition or substitution of one or more half-bridges along with, or in place of, full-bridges; and the choice of a variety of different types of power transistors.

Galvanic isolation via the transformer: Galvanic isolation for outputs enables having power outputs that are "floating" with respect to the input (meaning there are no direct electrical connections or no electric current conducting path between input and output). The benefits of galvanic isolation include, for example and without limitation: that ground loops can be broken to reduce noise in electrical systems; the output polarity can be freely chosen; and the current-isolation barrier (formed by the transformer 222) can form an important safety element to prevent electric shock and to reduce other hazards caused by electrical fault conditions (such as short circuits).

Transformer cooling: In some embodiments, the AC-to-AC transformer 222 provides for resonant coupling with current isolation at very high frequencies (well over 60 Hz), which enables the use of a small transformer with high power density and high efficiency (low power loss). Thus transformer 222 may provide for very efficient power transfer, or equivalently, very low power loss. As a result, the transformer 222 may generate high levels of heat. In some embodiments cooling for the transformer 222 may be provided for by conventional means, such as air cooling, heat sinks, and fans; but in alternative embodiments, cooling for transformer 222 may be provided for by alternative or additional cooling systems. For example, some embodiments of the present system and method may employ, for transformer cooling, a liquid/fluid cooling systems for high power-density (HPD) transformers, such as one of the exemplary cooling systems taught in co-pending PCT patent application number PCT/US20/26026, filed 31 Mar. 2020, applicant General Electric Company (hereinafter, the '026 application), or other liquid cooling systems within the scope of the claims of the '026 application.

Processor/Control: In various exemplary embodiments, A-PEBB LRU 200.A may include the use of or integration of a controller or microcontroller unit (MCU) 227 for regulation of switches, contacts, capacitors, cooling systems (not shown in FIG. 2), on-board status sensors (not shown in FIG. 2), and other factors requiring real-time control. Such control systems 227 may entail the use of microprocessors, digital input/output elements, memory (such a random access memory (RAM) and various forms of non-volatile memory), display systems, audio input and/or audio signalling systems, and/or analogue control elements known in the art or to be developed. The MCU 227 may employ suitable-coded software, stored in memory, to control various aspects of A-PEBB LRU 200. In particular, the MCU 227 may support the dynamic field configuration of A-PEBB LRU 200.A.

If will be noted in FIG. 2 that the MCU 227 is shown as being communicatively coupled with the active power stages 300.1, 300.2, but not with the isolation power stages 210.1, 210.2. This is exemplary only and is not limiting. While the present disclosure is directed towards the control of the adaptable power stages 300, in some embodiments of the present system and method the isolation power stages 210 may still have some internal elements requiring control or change. In the latter embodiments, the MCU 227 may be communicatively coupled with the active power stages 300 and also the isolation power stages 210.

Additional Elements: The terminal power stages 300.1, 300.2, also function as bridge converters, but are both field configurable as is discussed further below (see in particular FIG. 3 series and FIG. 4 series diagrams).

It will be understood that the topology of the exemplary A-PEBB LRU 200.A of FIG. 2 is exemplary only and not limiting. Other topologies may be employed within the scope of the appended claims. Similarly, certain essential components have been omitted from the figure for the sake of clarity. These components may include, for example and without limitation:

(i) An exterior casing or enclosure for the A-PEBB LRU 200.A;

(ii) Additional capacitors, as well as resistors and/or inductors; and (iii) Connector components to electrically and physically link the A-PEBB LRU 200.A into a backplane.

Adaptable Power Stage (A-PS)

The exemplary A-PEBB LRU 200 of FIG. 2, discussed immediately above, consists of four bridge converters 210, 300, also referred to as power stages 210. The two "outer" bridges or power stages are self-configurable or adaptable power stages 300. FIG. 3A presents a schematic illustration of an exemplary adaptable power stage (A-PS) 300 according to the present system and method.

High-Current Power Switching Elements for Bridge Conversion: In an exemplary embodiment of the present system and method, which is non-limiting, the A-PS 300 has a reconfigurable H-bridge converter (RH-BC) module 320 which includes four high-current power switching elements (HC-PS) 325.1, 325.2, 325.3, 325.4, also labelled in FIG. 3A as S1, S2, S3, S4. (For brevity, these may be referenced in this document simply as HC-PS 325.*n*, as HC-PS 325, or as HPCSE Sn.) In an exemplary embodiment, the components of each HC-PS include a SiC MOSFET power transistor 330, which is electrically connected in parallel with an antiparallel diode 335.

The four exemplary SiC MOSFET power transistors 330 are switchable (from on-to-off states and vice-versa) at switching frequencies up to at least tens of kilohertz or hundreds of kHz. As such, the power transistors 330 are suitable for current/voltage switching/sampling at these frequencies; and so in combination are readily suitable for converting AC-to-DC voltages, converting DC-to-AC voltages, converting a first AC frequency to a second AC frequency, and voltage inversion, all via suitable controlled modulation of the gate elements of the power transistors 330. Details of this are known in the art of bridge converters, and will not be repeated here. (It will be noted that, with galvanic isolation, an output AC frequency may be the same frequency as the input frequency or may be a different frequency.)

The exemplary reconfigurable H-bridge converter (RH-BC) module 320 may also include one or more capacitors and one or more resistors which are omitted from FIG. 3A. The RH-BC module 320 may also provide for voltage control of the gates of the SiC MOSFET switches, also omitted from FIG. 3A.

The illustration/use of SiC MOSFET power transistors 330 in A-PS 300 is exemplary only, and not limiting; in alternative embodiments the present system and method may employ other types of high current or high power switches, such as for example and without limitation various other types of MOSFETs and various types of insulated gate bipolar transistors (IGBTs) 325.

In exemplary embodiments of the present system and method, the four HC-PSs 325 are electrically connected via suitable conducting paths (wires or electrically conducting tracks) 340 according to the exemplary connection topology shown in FIG. 3A. Person's skilled in the relevant arts will recognize that these exemplary paths/connections 340 are suitable for establishing the four HP-CSes 325 together to function as an H-Bridge, similar to the fixed H-bridges 210 of FIG. 2 above. However, the present system and method introduces additional power connection points or nodes N (N3, N4, N6, N16, N14, N13), along with current routing switches 350 and inductors 355; associated with these latter elements are modified or additional circuit paths 340. Together, these elements may be used to dynamically modify the operations of the power switch module 300 in ways that are not possible with a conventional, fixed H-bridge 210. The details of this are discussed further immediately below.

Circuit conducting paths and topology: For convenience, and for identification in the presently appended claims and/or any claims which may be presented in the future with reference to this document, circuit nodes (connection points and/or branching points) have been labelled as N1, . . . , N32 (or generally as Ni, i=1, . . . , 32). It will be understood that the circuit paths 340 and circuit nodes Ni shown in the figure identify the circuit topology of the exemplary A-PS 300, and so constitute an exemplary description of the circuit. It will be seen, by way of a first example, that switch SW4 is connected between nodes N17 and N19, and that switch SW6 is connected between nodes N19 and N21, thereby electrically connecting switches SW4 and SW6 in series between nodes N17 and N21. By way of a second example, it will be apparent from the figure that inductor L1 and switch SW4 are connected in parallel between nodes N17 and N19, so that the state of switch SW4 being open or being closed may determine, in part, if current flows through inductor L1 or is shunted/short-circuited around inductor L1.

Similar identifications or characterizations for element connections and elements interactions, based on element connections to specific nodes, may be made for other circuit elements of exemplary A-PS 300.

It may also be noted that some adjacent nodes appear to be redundant, so that for example N6 and N7 may be electrically equivalent (having the same voltage, depending on the open/closed state of SW3), as are nodes N16 and N23. In some exemplary embodiments, nodes N7 and N23 may indicate physical points of electrical connection (via a plug, port, or other physical plug/outlet) between a physically separate reconfigurable H-bridge converter (RH-BC) module 320 and a current flow control (CFC) module 375.3 which may be on a physically separate circuit board. In alternative embodiments, all the component elements of an A-PS 300, including RH-BC module 320 and CFC module 375.3, may be mounted on a single, common physical circuit board or other single physical mounting structure (in which case nodes N7 and N23 may not be present). Circuit nodes N24 through N32 do not, strictly speaking, define any additional points of connection or branching. Circuit nodes N24 through N32 are included for convenience in identifying certain circuit points as may be useful either in this detailed disclosure (for example, for identifying the endpoints of some components), or in the appended claims, or potentially in the course of prosecution of this application.

Elements for Adaptable Current Routing and Adaptable Voltage-Sourcing/Current-Sourcing: In an embodiment of the present system and method, exemplary A-PS 300 includes nine-electrical current flow switches and/or electrical contactors 350, labelled in FIG. 3A as SW1-SW9 and SW14-SW16, along with two inductors 355 labelled in FIG. 3A as L1 and L2.

Switches: The current flow switches/contactors 350 may be mechanical switches suitable for manual control, and/or relay- or transistor-based switches which may provide for software-based control of the current flow in exemplary adaptable power stage 300. As is known in the art, a current flow (CF) switch 350 (whether manual contactor, relay, or transistor-based) which is in a "closed state" or "closed position" provides for current flow through the switch; while a CF switch/contactor 350 which is in an "open state" completely prevents any current flow through the CF switch 350.

By suitable selection of various, respective open and closed states for respective CF switches/contactors SW1 through SW9 and SW14 through SW16, the A-PS 300 is field configurable. "Field configurable" means that the A-PS 300 is adaptable for operational changes while being part of an A-PEBB LRU 200.A which is installed for operational use on board a ship or other electrical system 100.

MCU: In some embodiments, the A-PS 300 may include a power stage microcontroller unit (MCU‡) 327, which may for example be a microprocessor with suitable memory, firmware, and I/O ports. The MCU‡327 may provide various control functions for the A-PS 300. In particular, if some or all of the CF switches 350 can be remotely and/or automatically switched on or off (for example, either relays or transistor-based switches), then MCU‡327 may function to open or close various CF switches 350 to change between various conversion modes (CM.n) 392 of the A-PS 300.

Inductors: The two inductors 355 (L1 and L2), in combination with their proximate switches as shown in FIG. 3A, enables the exemplary A-PS 300 to function as either of a voltage-controlled power stage or a current-controlled power stage. With L1 being connected and L2 not connected, the power resource connection 302.1 (with inputs An and Bn) provides for voltage-source power conversion, making the A-PS a voltage-source power stage. Conversely, with L2 being connected and L1 not connected, the power resource connection 302.1 (with inputs An and Bn) provides for current-source power conversion, making the A-PS 300 a current-source power stage. Legacy power stages provide for only one or the other of voltage source or current source power conversion. The present system and method provides for field-configurable power control for (at any one time) either voltage source or current source power conversion.

As noted above in conjunction with FIG. 2 and exemplary A-PEBB LRU 200.A, the A-PS 300 works with other power stages 210, 300, along with a compact, high frequency isolation transformer 222, to provide for field configurable service for bidirectional DC to DC, DC to AC, and AC to AC conversion. More specifically, and via suitable open/closed settings of the current flow switches 350 (SW1-SW9 and SW14-SW16) the exemplary adaptable power stage 300 can be self-configured to be a bidirectional converter for any of the following conversion modes (CM) 392:

(CM1) Voltage Source Conversion: DC↔DC (Buck)
(CM2) Voltage Source Conversion: DC↔DC (Boost)
(CM3) Voltage Source Conversion: DC↔DC (Buck & Boost)
(CM4) Voltage Source Conversion: DC↔AC
(CM5) Voltage Source Conversion: AC↔AC
(CM6) Current Source Conversion: DC↔AC/DC FIG. 3B presents another view of exemplary A-PS 300, which is structurally the same as exemplary A-PS 300 of FIG. 3A. For purposes of exposition, FIG. 3B omits some labels shown in FIG. 3A, while providing some additional element labels as discussed immediately below. FIG. 3B also presents a view of the exemplary isolation power stage (I-PS) 210 as first presented in FIG. 2 above. Again for purposes of exposition, some elements of A-PS 300 and I-PS 210 have been provided with reference numbers which are approximately parallel in numbering, for the purposes of highlighting some differences between the exemplary A-PS 300 and an exemplary isolation H-bridge 210 as may already be known in the art. (That is elements 380 and 280 employ parallel reference numbering. For example, current routing junction 380.S.1 corresponds, topologically, to node 280.1, and similarly for other CR junctions/nodes 380.S.n and 280.n.)

As seen in FIG. 3B, a conventional, isolation power stage H-bridge 210 has multiple fixed nodes for 280 for routing current into, out of, and between elements of the I-PS 210, such as nodes or node pairs 280.1, 280.2, 280.3, and 280.4. The exemplary, reconfigurable H-bridge converter (RH-BC) 320 of the present system and method employs current routing junctions (CRJ) 380 in place of the nodes or node pairs 280.n.

A current routing junction (CRJ) 380 may be either of: (i) a CRJ for switching (380.S), which is a pair of nodes Ni, Nj which provide placement for an open/closed switch at a selected circuit position where a conventional H-bridge simply presents a continuous circuit path, and (ii) a CRJ for attachment (380.A) which provides for additional circuit path connection nodes which are not employed in a conventional H-bridge. In either form (attachment CRJ 380.A or switching CRJ 380.S), the CRJs 380 enable on-the-fly modifications of H-bridge topology and operations. The A-PS 300 further employs one or more current flow control (CFC) modules 375 which may be attached to the pair of nodes of any one CRJ 380. A CFC 375 module in turn may include one or more contactors (SWn) 350, one or more inductors (L) 355, and possibly other circuit elements such as additional transistors, capacitors, or resistors (not shown in the figures).

Re-configurable H-bridge topology: As noted above in conjunction with FIG. 2, the present system and method has four power switches 325.1, 325.2, 325.3, 325.4. The four power switches 325 are mutually coupled and arranged in a connection topology which is substantially similar to that of a conventional H-bridge 210, as is apparent at least from FIGS. 3A and 3B.

The exemplary reconfigurable H-bridge converter module 320 has switches 325.1 and 325.2 directly connected in series, forming a first half-bridge 328.1 (see bracketed elements 328.1, 328.2 in FIG. 3B); switches 325.3 and 325.4 are also directly connected in series, forming a second half-bridge 328.2; the two half bridges 328.n are generally connected in parallel (though the contactors 350 of the present system and method may provide for some variations from this in some modes); and each of the half bridges 328.1 and 328.2 has a respective power connection node (N22, N15) between each of the respective series power switches. Other connection elements may be seen from FIGS. 3A and 3B. For purposes of exposition and in the appended claims, this connection topology may be referred to as a reconfigurable H-bridge topology. The present system and method has provisions for switches and passive current/voltage control elements in the CFCs 375 which can alter the path and character of current flow at selected points in the RH-BC module 320.

CRJ 380.S.1: For example, in place of the fixed power-source access node 280.1 of the I-PS 210, the present system and method provides for two nodes (N10, N25) which together serve as current routing junction (CRJ) 380.S.1. CRJ 380.S.1 may then, in turn, be connected with a CFC module such as exemplary CFC module 375.1. Exemplary CFC module 375.1 is configurable, via switches SW1, SW14, and SW15, to provide for any of: (i) the direct flow of current (AC or DC) through CRJ 380.S.1 (SW15 closed, SW14 open); (ii) no flow of current through CRJ 380.S.1 (SW1, SW14, SW15 all open); (iii) the flow of current through CRJ 380.S.1 via an inductor L2 (SW14 closed, SW15 open); or (iv) short-circuiting (providing a direct current path) nodes N10 and N25 (via closure of SW1).

CRJ 380.S.2: For another example, in place of the fixed power-source access node 280.2 of the I-PS 210, the present system and method provides for two nodes (N12, N26) which together serve as current routing junction (CRJ) 380.S.2. CRJ 380.S.2 has a single switch SW2, which in the closed state short-circuits nodes N12 and N26.

CRJ 380.A.1, CRJ 380.A.2: For another example, the paired circuit nodes 280.3, 280.4 of I-PS 210 (which may be viewed as topologically analogous to CRJ connections 380.A.1, 380.A.2 of A-PS 300) provide for only fixed current routing. By contrast, the CRJ connections 380.A.1, 380.A.2 of RH-BC 320 provide provision for multiple connections to exemplary CFC module 375.3. CFC module 375.3 in turn has an inductor L1, and six contactors 350 (SW3, SW4, SW5, SW16, SW8, SW9), which can be set in a variety of combinations of open/closed settings 395 to achieve various current routings within A-PS 300; and further thereby to achieve various different operational conversion modes CM 392 for A-PS 300. Exemplary operational modes 392 and contactor settings 395 are discussed further below in conjunction with FIG. 3C.

It will be noted that many elements of A-PS 300 are exemplary only. These include the number and location of the current routing junctions (CRJ) 380; and the internal elements and configurations of the CFC modules 375. In alternative embodiments, an A-PS 300 may employ more, fewer, or alternative CRJs 380; and may similarly employ more, fewer, or different CFC modules 375 with different internal components or arrangements of components. Persons skilled in the relevant arts will appreciate that such alternative embodiments may entail variations in the operational modes discussed above and also below in conjunction with FIG. 3C.

FIG. 3C presents a Table Λ 390 which lists the above-defined conversion modes CM 392 for exemplary A-PS 300, along with the suitable open/closed settings 395 for the contactors 350 and the appropriate input/output polarity settings 397.

It will be noted that the buck & boost configuration (CM3) utilizes only a half of the full-bridge, with half of the rated H-bridge capacity, but provides for either buck or boost functionality at any given time. As further noted in Table Λ 390:

(I) For CM4 and CM5, the default and preferable setting for SW14 is open. However, SW14 could be in either open or closed position (non-conducting or conducting). In operation, and in some embodiments, SW14 may be left in its previous position (open or closed) even when other switches may be reset to change into modes CM4 or CM5.

(II) For CM5 to be operable in an A-HPEBB LRU 200, both adaptable PEBBs (A-PEBBS) 300.1, 300.2 (that is, the two terminal A-PEBBS, see FIG. 2) must each be set to mode CM5. The applicable input and output connections then are for the entire A-PEBB LRU—that is, connections (X0, Y0) and (X5, Y5) (see again FIG. 2).

General and Specific Operations: It will be apparent to persons skilled in the relevant arts that, for a given set of circuit elements, the functions and outputs of an electrical circuit will vary depending on variations in the routing and connections of those components. The present system and method takes bridge converter power stages (in an embodiment, H-bridges) and modifies them with the addition of new components, such as inductors; and/or by rerouting some circuit paths.

For an exemplary adaptable power stage A-PS 300, and as discussed above, Table Λ 390 of FIG. 3C presents the resulting power conversion modes when various electrical contactors 350 are set to open or closed positions in various combinations. It will be noted from Table Λ 390 that, in some operational modes CMn, the mode 392 may be determined both by the settings 350 for open/closed switches CMn, and by the choice of power input or power output 397 at terminal nodes 302.1, 302.2, (An, Bn) and (Xn, Yn) respectively. That is, for some modes of operation 392—for instance, exemplary modes CM1 and CM2—identical settings of switches 350 result in different operational modes (buck or boost, respectively) depending on whether the DC input voltage is applied to node 302.1 (An, Bn) or to node 302.2 (Xn, Yn).

For exemplary A-PS 300 of FIG. 3A, FIGS. 4A, 4B, 4C, and 4D illustrate the resulting effective circuit configurations for the various switch settings 395 of the different conversion modes CM 392.

It will be noted that some figures have not just one, but instead two figure numbers for the effective circuits (for example, 300.1, 300.2 for FIG. 4A). The index numbers "n" ("300.n") refer to the corresponding conversion modes in each case. So for FIG. 4A, the one set of switch settings 395 may result in either mode CM1 or CM2, depending on the choice of inputs/output terminals 302 (column 397 of Table Λ).

In FIGS. 4A-4D, solid circuit lines 410 ("——") represent the actual current conducting paths that result from the illustrated switch settings. In the same figures, dotted circuit lines ("----") 420 represent non-conducting paths, that is, circuit paths which are present on the A-PS 300 but are not conducting any current due to one or more open switches. (Note that in the case of inductors 355 (L1 and/or L2), an inductor 355 may be non-conducting if a switch arranged in parallel is closed; for example, if switch SW4 is closed, this may effectively shunt current around inductor L1.) In the figures, then, the dotted (non-current carrying) circuit lines 420 as shown for purposes of exposition and learning only, as they illustrate the circuit paths of exemplary A-PS 300 which are rendered null (non-conducting) for the conversion mode illustrated.

As noted above, the DC to DC buck & boost configuration (CM3, FIG. 4B) utilizes only a half of the full bridge (with half of the rated H bridge capacity), and it provides only one of buck or boost functionality at any given time. The topology or functionality reconfiguration/adaptation can be accomplished via software reconfiguration, and it does not require hardware changes (that is, does not require physical position changes) to any of switches SW1-SW9 or SW14-W16 position.

The operations of each of these effective circuits 300.1, . . . , 300.6 for various conversion modes (A/D-C↔A/D-C, buck or boost, voltage source or current source) will generally be apparent to persons skilled in the relevant arts, based on the circuit elements and wiring connections illustrated.

AC↔AC Conversion Modes: It will be noted with respect to FIG. 4C, for AC←→AC conversion (conversion mode CM5, A-PS 300.5), two A-PS's 300.5 would be needed and cascaded back-to-back as (AC↔DC↔AC) with a common DC link. Similarly with respect to FIG. 4D, an AC↔AC conversion mode could be established by using two A-PS's 300.6 cascaded back-to-back as (AC↔DC↔AC) with a common DC link.

Role of Inductors: The presence of inductor L2 and effective removal (short-circuiting) of inductor L1 supports current source conversion; the effective removal of L2 (that is, the short-circuiting or current blocking on L2) supports voltage source conversion (with or without L1 being an effective part of the circuit); and the effective presence of L1 limits the circuit to DC-to-DC only conversion.

Power Transistor Gate Switching: Persons skilled in the relevant arts will appreciate that, in addition to changing the open/closed states of contactors 350 (SW1, . . . SW9, SW14 . . . SW16), different operational conversion modes CM.n 392 may also entail variations in the on/off switching patterns (or switching timings) for the gates G of the four high current switching elements (HC-PSs) 325. The switching patterns may be controlled by a programmable microcontroller 327 of the A-PS 300, or by a microcontroller 227 of the A-PEBB LRU 200.A.

Voltage Source Conversion Vs. Current Source Conversion Modes

For the exemplary adaptable power stage (A-PS) 300, and as will be apparent from figures and discussion above, modes CM1 through CM5 are all voltage source conversion (VSC) modes, where inductor L2 is not active (no-current flowing through), and where An/Bn are employed as a voltage source. Mode CM6 provides for current source conversion with a current source at An and Bn; current entering at An/Bn goes through inductor L2 (SW 14 and SW1 are closed, SW15 is open), while inductor L1 is not active (SW3 and SW16 are open, SW4 and SW6, SW5 and SW7 are closed).

Legacy power stage technologies provide for one of VSC or CSC. The present system and method provides for an adaptable power stage 300 which support both VSC and CSC operations (though only one at a time), configurably.

In emerging present day technologies, CSC modes are becoming much more important (for permanent magnet motor applications). With permanent magnet motor applications, if the permanent magnet motor is connected as a load to Xn/Yn, the motor generates electric current after shutdown which introduces unwanted feedback into the A-PS 300. But with a permanent magnet motor connected as a load to Xn/Yn with CSC operations (mode CM6), the inductor L2 functions as a current-limiting safety device.

Exemplary Power Converter

In a simplest-case scenario, a relatively modest electrical system 100 may have only a single power converter 500.A, and the single power converter 500.A in turn may itself be a single A-PEBB LRU 200.A. For example, a "lower end" large-scale electrical system 100 (which may perhaps be referred to as a "medium scale electrical system") may employ one power converter 500 with a single A-PEBB LRU 200 which may be rated at 1000 volts and 125 kW.

For higher voltage and higher power applications, one, two, or more power converters 100 may be employed; and further, each power converter 100 may have two or more A-PEBB LRUs 200.A. Each A-PEBB LRU 200.A within a single power converter 100 is then a modular building block that can be stacked-up/networked (in parallel and/or in series); the combined A-PEBB LRUs 200.A (possibly in combination with one or more non-configurable PEBB LRUs 200.nc) together scale-up to form a larger converter with multiple PEBB LRUs 200.A (200.nc) to meet the higher voltage and power requirements. For brevity and simplicity of exposition, most of this documented addresses only the A-PEBB LRUs 200.A. With the self-configurability/adaptability of two or more A-PEBB LRUs 200.A, the scaled-up A-PEBB converter 100.A, taken as a whole, can be in any of the power conversion modes listed above in the exemplary Table Λ 390 of FIG. 3C.

FIG. 1, already discussed above, illustrates in schematic form an exemplary an exemplary A-PEBB converter 500, according to the present system and method. FIG. 5 presents in more detail another exemplary A-PEBB converter 500, according to the present system and method. The exemplary A-PEBB converter 500 of FIG. 5 may be, for example, a megawatt-scale low voltage (LV) DC (up to 1000 V DC) to medium voltage (MV) AC (e.g. 4160 V AC) A-PEBB power converter 500. In one exemplary embodiment, A-PEBB Power Converter 500.A may have three power resource connections 505 for three different power resources 110, which can be switchably connected or disconnected via resource switches RS.

FIG. 5 is an example of an A-PEBB converter connecting with an MVAC (4160V ac) primary distribution bus 110.P, and a secondary LVDC (for example, up to 1000 V dc) energy storage or solar PV distribution bus 110.S. A load can also be connected to the regulated LVDC bus/port 110.L. The exemplary A-PEBB converter 500.A is operating in AC to DC and DC to AC conversion modes.

The exemplary A-PEBB power converter 500.A of FIG. 5 integrates multiple A-PEBB LRUs 200.A.n into a single power converter. The A-PEBB power converter 500.A is further configured to for 3-phase power (A, B, C).

The choice of which contact switch settings 395 and which power conversion mode(s) CM.n 392 are employed by the A-PEBB converter 500 when in field use will in practice depend on a variety of situational/contextual factors, including for example and without limitation: the operating conditions; available power/energy sources; expected average and/or maximum loads; system health (which may be determined by power system sensors not shown in the figures); and environmental conditions (which may be determined by environmental sensors beyond the scope of this document).

In various exemplary embodiments of an A-PEBB power converter 500, and for higher voltage and higher power applications, each A-PEBB LRU 200.A functions as a modular building block that can be stacked up/networked in parallel and/or in series to scale-up to a larger converter 500 with multiple A-PEBB LRUs 200.

Three-Phase Power: Shown in FIG. 5, in schematic form, are three electrically-coupled backplanes 505.A, 505.B, and 505.C, with a first backplane 505.A for A-PEBB converter phase A shown in the foreground. In an alternative embodiment, all three backplanes 505.Z may be structurally integrated into a single physical backplane. For the exemplary A-PEBB converter 500.A, each backplane 505.Z has mounted on its four separate A-PEBB LRUs 200.A.1, . . . , 200.A.4. The three backplanes each function as three phase converters, 203.A, 203.B, 203.C (or "203.P", in brief), each of which is a power converter 203 for a single phase A, B, or C of the power system 100. The four A-PEBB LRUs 200.A within each phase (A, B, C) are connected 530.1, 530.2 in parallel on both sides of the AFE power stage, enabling dual (un-regulated and regulated) DC buses/links. The four LRUs 200.A.n are connected in series 537 on the AC port/side of the A-PEBB LRUs 200.A. Both un-regulated and regulated LVDC (on both sides of the AFE power stage) of the three phases (A, B, and C) are connected 502 in parallel. The neutrals 504 on the MVAC side of the three phases are tied together.

System Control and Mode Switchings: In various exemplary embodiments, the present system and method may entail the use of integration of control systems or microcontrollers (MCU") 527 for regulation of switches, capacitors, cooling systems, and other factors requiring real-time control. Such control systems 527 may entail the use of microprocessors, digital input/output elements, memory (such a random access memory (RAM) and various forms of non-volatile memory), display systems, audio input and/or audio signalling systems, and/or analogue control elements known in the art or to be developed. Such control systems 527 may employ suitable-coded software, stored in memory, to control various aspects of system operations.

In some embodiments, the MCU" 527 may regulate, monitor, and/or control the microcontroller (MCUs) 227 of the A-PEBB LRUs 200.A; and/or regulate, monitor, and/or control the MCUs‡327 of adaptable power stages A-PS 300 within the A-PEBB LRUs 200.A. Through suitable signalling and/or control mechanisms, the A-PEBB Power Converter 500 may dynamically and/or automatically change power conversion modes during field operations.

When and if solar PV power source is available, the exemplary A-PEBB converter 500 with multiple A-PEBB LRUs 200.A and microcontroller 527 can therefore be self-reconfigured to operate in a DC to DC mode to charge a battery system 110.B, or in a DC to DC or DC to AC mode to support loads or to interface with the grid (primary bus 110.1).

In various embodiments of the present system and method, and with various choices of A-PEBB LRUs 200.A along with suitable switch settings throughout, the loads can/may also be a propulsor (e.g., a rim driven motor/thruster or a pontoon-integrated/driven propeller), in which case the power required may be in a megawatt scale. Due to the modularity of the A-PEBB converter 500, multiple A-PEBB LRUs 200.A can be integrated and distributed around the rim of the propulsor/propeller, or inside the pontoons, to: (i) meet the propulsion power requirement while saving space, (ii) simplify service and maintenance (e.g., replacing A-PEBB LRUs), and (iii) provide for/enable a convenient and effective cooling thermal management (via water cooling from the ocean, sea, or river) for the A-PEBB converter 500.

Redundancy and Self-Healing: The exemplary A-PEBB converter 500 inherently has built-in redundancy. During a mission, any failed/malfunctioning A-PEBB LRUs 200.A can be bypassed to keep the converter 500 running, or to maintain converter-based power distribution operation with equivalent or reduced/de-rated capacity. Further Depending on the health conditions and availability of sources and loads during a mission, the A-PEBB converter 500 can be re-configured or re-purposed to optimize/maximize the operation of the remaining available assets. This "self-healing" adaptability can help provide for power distribution with field survivability when the power system 100 is employed in in conflict missions or hostile environments (where some sources and loads may be damaged or become unavailable). The self-reconfigurability is also useful in fully utilizing NOMARS (or other mobile system) onboard assets in normal operating conditions. For example, during a shiny day, an A-PEBB converter 500 can be configured to convert solar PV energy (if present) to support loads or to charge the electrical system 100 during the day. The A-PEBB converter 500 can then be re-configured or repurposed to interface with other available sources (generators or batteries) to support loads at nights.

Above, exemplary embodiments of the present system have been presented with exemplary components of various power, current, and/or voltage ratings. Other power/current/voltage ratings may be employed within the scope of the appended claims.

Power Quality Requirements and Filters

As described above, an in exemplary embodiments of the present system and method, an adaptable PEBB power converter 500.A may have multiple A-PEBB LRUs 200.A, possibly along with multiple non-configurable PEBB LRU's 200.*nc*, which are networked or connected in series and/or in parallel to build a converter 500 to meet specific voltage and power requirements. In some embodiments, multiple LRUs 200 will be interleaved. The equivalent switching frequency for the A-PEBB power converter 500.A as a whole will then be multiple times faster than the switching frequency (for example 10 kHz) of any individual LRU.

Due to the high equivalent switching frequency of the full scale converter 500, ripples of the electrical voltage and current signals are expected to be small. As a result, additional frequency filters will typically not be needed.

However, in some embodiments of the present system and method, which may have requirements of ultra-high power quality, additional ripple filter(s) 600 to address voltage and/or current ripples may be added to the system 100. In some embodiments of the present system and method, one or more adaptable ripple filters (ARF) 600 may be added at the converter 500 level (rather than at the LRU level). FIG. 6 illustrates in schematic form an exemplary reconfigurable or adaptable RLC filter 600 according to present system and method, which includes an inductor (L3) 655, a capacitor (C1) 657, and a resistor (R1) 659 connected in series. The exemplary ARF 600 also includes multiple current routing switches SW 17, SW18, and SW19, which may be used to configure the filter 600. Table β (beta) 680 shows corresponding switch positions of voltage or current filters for different power conversion modes of the adaptable power converter 500.

In some exemplary embodiments of the present system and method, which employ an adaptable PEBB power converter 500 with three-phase power, each power phase (A, B, C) may have its own respective, independently connected filter 600.*a*, 600.*b*, and 600.*c*, as illustrated schematically in FIG. 6.

Method

In exemplary embodiments discussion above in this document, in conjunction with FIGS. 1-7, a system is presented for a power converter 500, and elements of the power converter 500 (such as adaptable power electronics building blocks line replacement units 200.A and adaptable power stages 300), which provide for field-adaptable power conversion in response to changing electrical requirements. In some embodiments of the present system and method, the field adaptations may be made automatically via software and software modules running on any of microcontroller units 227, 327, 527 discussed above.

Persons skilled in the relevant arts will appreciate that the specific functionality and control functions of the software may be implemented via one or multiple processors of MCUs 227, 327, 527, and may further be partly implemented via other digital or analog processing units (not illustrated in the figures) which may be associated with transport vehicles that employ the present power electronics systems 100. Thus, the methods disclosed herein may be implemented via a single MCU 227, 327, 527, or via software distributed among multiple networked MCUs 227, 327, 527. For example, in some embodiments of the present system and method, some environmental sensing functions and determinations, mission assessments, and electrical system status assessments (including assessments of power resources 110) may be performed by sensors and/or processing units (along with suitable memory and sensors) which are not part of the adaptable power converter 500; these functions may instead be performed by processors, memory, and sensors which integrated into elements of the larger mobile, adaptable electrical system 100. Such processors and sensors may include sensors/processors associated with various power resources (sources and loads) 110.

FIG. 7 presented a flow chart of an exemplary method 700 for automated regulation and adaptability for a power converter 100 according to the present system and method.

Method 700 begins with step 710. In step 710, the method identified present and/or future mission requirements, power needs, operational/situational environment(s), and electrical system status/health. The mission requirements assessments may be based, at least in part, on pre-defined and stored mission definitions associated with various locations, times, and sensed mission contexts. In turn, power needs may be determined via algorithms and/or pre-defined databases which associate various respective mission requirements M1, . . . , Mn with respective, associated electrical system power loads PL1, . . . , PLn. In turn, mission requirements M1, . . . , Mn may be determined in whole or in part by sensed operational/situational environments OSE.

The method 700 continues with step 720, which identifies present and/or future electrical system power source(s) and/or power load(s). Algorithms for determining power sources 110.1 may include identifying environmental factors and/or system health status. For example, a determination of time of day and weather conditions may indicated the availability or lack of availability of solar power. Other power source determination factors may include an assessment of available fuel for generators 110.1, generator system health, available battery charge, and similar considerations. The method 700 may then also prioritize various potential loads according to an assessment of total available power, possibly factoring in expected mission duration.

Based on the above determinations—available power sources 110.1 and expected, mission-specific loads 110.2—in step 730 the method determine appropriate power conversion requirements for one or more adaptable power converters 500, and for their internal A-PEBB LRU(s) 200.A.

For example, a first mission (at a first point in time) may utilize AC power from a generator to support multiple DC loads, with a lone or primary requirements for AC-to-DC power conversion with low output voltages. At a later point in time, a different mission may only have available DC power (from batteries or solar power, for example) which must support multiple AC and DC loads, and so require system-wide DC-to-AC power conversion with high voltage or current requirements. Based on such assessments, step 730 identifies the contextual, mission specific conversion requirements for the power converter(s) 500 and their internal A-PEBB LRU(s) 200.A.

The method continues with step 740. In step 740, and based on the required, respective power conversion modes RPCM1, . . . , RPCMx for A-PEBB LRU(s) APEBBLRU.1, . . . , APEBBLRU.(x−1), APEBBLRU.x, the method determines the appropriate internal open/closed states for the numerous contactors 350 of specific power stages A-PS.1.1, A-PS.1.2, . . . , A-PS.(x−1). 1, . . . A-PS.(x−1).2, A-PS.x.1, . . . A-PS.x.2. These required states for contactors 350 may be based for example on stored versions of Table Λ 390 and/or Table β 680.

In step 750, and based on the determinations of step 740, the method sets the appropriate open/closed states of contactors 350 throughout the power system. In step 750, the present system and method may also, concurrently send suitable power control commands to various power resources 110 through the electrical system 100.

VI. FURTHER EMBODIMENTS

Transformer: In some embodiments, variations may be employed in the power transformer 222 as well. For example, rather than employing a winding ratio of 1:1, some embodiments of the present system and method may employ other winding ratios such 1:2, 1:3, or 2:3. In an alternative embodiment, the A-PEBB LRU of the present system and method may be provisioned with two or more separate transformers, and further provisioned for field-selection of a particular transformer for routing the current. The field selection may be by way of additional switches, either mechanical, relayed-based, or transistor/IC-based, not shown in the figure. The latter embodiment may allow for field selection of transformers with different winding ratios, or among two or more Adaptable power stage (A-PS) 300: In some embodiments of the present system and method, the A-PS 300 can be built from discrete elements (current flow switches 350, power switches 325, inductors 355) which are discrete elements, employing mechanical contacts (relays) as the current flow switches 350. All these discrete elements may be built into an A-PS 300 system on a single module as an integrated unit. The power transistors 330 of the power switches 325 may be IGBT transistors, MOSFET transistors, or other types of solid state power transistors.

In alternative embodiments, the CF contactors 350 may be solid state (semiconductor) elements such as bi-polar junction transistors (BJTs) or MOSFETs. In some such embodiments, an exemplary A-PS may be implemented as an integrated circuit (IC).

Above, exemplary embodiments of the present system have been presented with exemplary components of various power, current, and/or voltage ratings, for example 1.7 kV switches and 10 kV switches. Other power/current/voltage ratings may be employed within the scope of the appended claims.

Power Stages and A-PEBB LRUs: In exemplary embodiments presented above in this document, an exemplary A-PEBB LRU 200.A includes two adaptable power stages A-PS 300, each of which may be substantially similar in internal design. Persons skilled in the relevant arts will appreciate that in alternative embodiments of the present system and method, an A-PEBB LRU 200.A may include only one, only two, or three or more adaptable power stages A-PS 300. Similarly, in alternative embodiments of the present system and method, an A-PEBB LRU 200.A may include one, two, or three or more adaptable power stages A-PS 300, some of which or each of which may differ in some respects from the exemplary A-PS 300 discussed above in this document.

In some embodiments, an A-PS 300 may have more or fewer CF contactors 350 than the exemplary number of switch contactors described above, possibly with a different switching topology, and more or fewer inductors 355. Similarly, in some embodiments, an A-PS 300 may have more, fewer, or different power conversion modes 392 than those enumerated above in conjunction with Table Λ 390; further, such power conversion modes may be achieved via contactor settings 395 other than those enumerated above in Table Λ 390.

VII. ADAPTIONS AND MODIFICATIONS, AND CONCLUSION

Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope of the disclosure. Therefore, it is to be understood that, within the scope of the appended claims, the disclosure may be practiced other than as specifically described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

In particular: It will be understood by persons skilled in the relevant arts that, in some embodiments of the present system and method, the power stages A-PS 300, A-PEBB LRUs 200.A, and power converters 500 are structurally composed of individual, fundamental electronic components such as power transistors 330, diodes 335, inductors 355, electrically conducting circuit paths 340 (typically composed of various metals or metal alloys), current flow switches/contactors 350, and other components such as resistors or capacitors which may not be shown in the figures. It will be further understood that for such embodiments, a complete description of the circuit topology and operations may be provided for entirely in terms of the connections and operations of the fundamental electronic components 330, 335, 340, 350, 355. The groupings of these components into functional/block/modular units such as RH-BC modules 320, HC-PSs 325, and CFC modules 375, as well as into adaptable power stages A-PS 300 and A-PEBB LRUs 200.A is for convenience of exposition.

The descriptions in this document of the system operations in terms of both fundamental components and alternatively in terms of functional/block/modular units are intended to supplement each other, and should not be construed as limiting. In some alternative embodiments, some functional modules 320, 325, 375, 300, 200.A, 500 may employ alternative components or additional fundamental components, with the invention still being operative in terms of the functional modules 320, 325, 375, 300, 200.A, 500 as described herein. Similarly, fundamental electronic components 330, 335, 340, 350, 355 may be understood as being grouped or organized, for purposes of functional or operational description, into modules other than those specifically described in this document.

It should be noted that the simulation, synthesis, and/or manufacture of the various embodiments of this invention can be accomplished, in part, through the use of a variety of materials, including metals, non-metals, resins, epoxies, semi-conductors, glass, polymers, ferrous materials, non-ferrous materials, conductors, insulators, and liquids, some known in the art and some yet to be developed.

Where computer code is required for the present system and method, such as for control systems 227 running on microprocessors, computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and intranets.

It is understood that control functions or monitoring functions to be accomplished in conjunction with the systems and techniques described above can be represented in a core (such as a CPU core) that is embodied in program code and can be transformed to hardware via suitable circuits, wireless communications, and/or optical messaging.

It is to be appreciated that the Detailed Description section (and not the Summary and Abstract sections) is primarily intended to be used to interpret the claims. The Summary and Abstract sections may set forth one or more but not all exemplary embodiments of the present invention as contemplated by the inventor(s), and thus, are not intended to limit the present invention and the appended claims in any way.

Further regarding the appended claims, any and all reference signs/numbers are provided to make the claims easier to understand, and are not to be treated as limiting the extent of the matter protected by the claims; their sole function is to provide for clear reference to elements in the disclosure and drawings.

What is claimed is:

1. An adaptable power stage (A-PS) for an adaptable power converter, the A-PS comprising:
    four high-current solid state power switches (HCPS), arranged and electrically coupled to form a reconfigurable H-bridge converter (RH-BC) comprising a plurality of current routing junctions (CRJ); and
    a plurality of respective current flow control (CFC) modules coupled to respective current routing junction modules, each current routing junction module comprising one or more current flow contactors (CFC);

wherein the adaptable power stage is adaptable for a plurality of alternative power conversion modes, each power conversion mode of the plurality of alternative power conversion modes is determined at least in part via a specific set of open/closed settings of the one or more power contactors of the CFC modules.

2. The A-PS of claim 1, wherein at least one CFC module of the plurality further comprises:
an inductor; and
one or more current flow contactors which may be switchably set to enable current flow through the inductor or to prevent current flow through the inductor.

3. The A-PS of claim 1, wherein at least one CFC module of the plurality further comprises a plurality of current flow contactors, wherein the plurality of current flow contactors are coupled to provide for at least one of:
(i) two or more different current paths between a first current resource 302.n and the RH-BC);
(ii) two or more different current paths between a second current resource 302.n and the RH-BC); and
(iii) two or more different current paths between a first CFC module and a second CFC module;
(iv) a selection of either a current flow or a non-current flow through a selected high-current power switch of the RH-BC;
(v) a selection between no current flow and current flow from a drain (D) or a source (S) of a selected high-current power switch of the RH-BC; and
(vi) a selection between a first current path and second current flow path for a drain (D) or a source (S) of a selected high-current power switch of the RH-BC.

4. The A-PS of claim 1, further comprising a microcontroller unit (MCU) (327) configured to control the open/closed states for one or more current flow switches.

5. The A-PS of claim 1, wherein the plurality of current flow control (CFC) modules comprises a CRC module configured to switchably determine if a current flow between a first power resource port (An, Bn) and the RH-BC module includes or does not include an inductor L1, wherein:
the inclusion of the inductor L1 configures the A-PS for current source conversion at the first power resource port; and
the exclusion of the inductor L1 configures the A-PS for voltage source conversion at the first power resource post.

6. The A-PS of claim 1, wherein the plurality of current flow control (CFC) modules comprises a CRC module with a plurality of contactors SW3, SW4, SW5, SW6, SW7, SW16, SW8, SW9 which are configured to select, in combination, from among a plurality of current flow paths between the RH-CB module and a second power resource port (Xn, Yn) of the A-PS.

7. The A-PS of claim 1, wherein the plurality of alternative power conversion modes comprises: a DC↔DC buck mode (CM1); a DC↔DC boost mode (CM2); a DC↔DC buck and boost mode (CM3); a DC↔AC mode (CM4); and an AC↔AC mode (CM5).

8. The A-PS of claim 7, wherein the plurality of alternative power conversion modes further comprises a DC↔AC/DC mode (CM6).

9. The A-PS of claim 8, wherein:
the A-PS comprises twelve current flow contactors, and
the plurality of alternative conversion modes are switchably selectable via open/closed settings for the twelve current flow contactors.

10. The A-PS of claim 9, wherein the twelve current flow contactors, the two inductors, and the four high current power switches are electrically coupled according to the schematic configuration of FIG. 3A.

11. The A-PS of claim 10, wherein the plurality of conversion modes are selectable at least in part via specific open/closed settings of the current flow contactors according to the Table A of FIG. 3C.

12. The A-PS of claim 1, wherein the current flow contactors are configured to provide for at least one conversion mode with a reversible flow for either of a DC-to-AC current and an AC-to-DC current between a first power-resource port 302.1 and a second power-resource port 302.2 of the A-PS, wherein a single set of current flow contactor settings provides for the either of a DC-to-AC current and an AC-to-DC current.

13. An adaptable power electronics building block line replacement unit (A-PEBB LRU) comprising:
a first adaptable power stage and a second adaptable power stage; and
a solid state transformer;
wherein:
the first adaptable power stage and the second adaptable power stage are coupled in series via the solid state transformer;
the first adaptable power stage and the second adaptable power stage each provide for a respective first and second power resource port of the A-PEBB LRU; and
the A-PEBB LRU is adaptable, via settings of the first and second adaptable power stages, for a plurality of power conversion modes.

14. The A-PEBB LRU of claim 13, wherein the solid state transformer comprises a first isolation bridge-converter and a second isolation bridge-converter (210.2) which are coupled in series via a high frequency transformer.

15. The A-PEBB LRU of claim 13, wherein each adaptable power stage of the first adaptable power stage and the second adaptable power stage comprises:
four high-current solid state power switches (HCPS), arranged and electrically coupled to form a reconfigurable H-bridge converter (RH-BC) comprising a plurality of current routing junctions (CRJ); and
a plurality of respective current flow control (CFC) modules coupled to respective current routing junction modules, each current routing junction module comprising one or more current flow contactors (CFC);
wherein the adaptable power stage is adaptable for a plurality of alternative power conversion modes, each power conversion mode of the plurality is determined at least in part via a specific set of open/closed settings of the one or more power contactors of the CFC modules.

16. The A-PEBB LRU of claim 15, wherein at least one CFC module of each adaptable power stage further comprises:
an inductor; and
one or more current flow contactors which may be switchably set to enable current flow through the inductor or to prevent current flow through the inductor.

17. The A-PEBB LRU of claim 15, wherein at least one CFC module of each adaptable power stage further comprises a plurality of current flow contactors, wherein the plurality of current flow contactors are coupled to provide for at least one of:
(i) two or more different current paths between a first current resource and the RH-BC);

(ii) two or more different current paths between a second current resource and the RH-BC); and
(iii) two or more different current paths between a first CFC module and a second CFC module;
(iv) a selection of either a current flow or a non-current flow through a selected high-current power switch of the RH-BC;
(v) a selection between no current flow and current from a drain (D) or a source (S) of a selected high-current power switch of the RH-BC; and
(vi) a selection between a first current path and second current flow path for a drain (D) or a source (S) of a selected high-current power switch of the RH-BC.

18. The A-PEBB LRU of claim 15, further comprising a microcontroller unit (MCU) configured to control the adaptable power stages.

19. The A-PEBB LRU of claim 13, wherein the plurality of power conversion modes comprises: a DC↔DC buck mode (CM1); a DC↔DC boost mode (CM2); a DC↔DC buck and boost mode (CM3); a DC↔AC mode (CM4); and an AC↔AC mode (CM5).

20. The A-PEBB LRU of claim 19, wherein the plurality of power conversion modes further comprises a DC↔AC/DC mode (CM6).

21. An adaptable power electronics building block power (A-PEBB) power converter comprising at least one adaptable power electronics building block line replacement unit (A-PEBB LRU) according to claim 13, wherein:
the A-PEBB LRU is adaptable for a plurality of alternative power conversion modes, each respective power conversion mode of the plurality of alternative power conversion modes being determined at least in part via a specific, respective set of open/closed settings of one or more switchable power contactors of the A-PEBB LRU; and
the A-PEBB power converter is adaptable for the plurality of alternative power conversion modes via the power conversion mode settings of the at least one A-PEBB LRU.

* * * * *